US011162008B2

(12) United States Patent
Marr

(10) Patent No.: US 11,162,008 B2
(45) Date of Patent: Nov. 2, 2021

(54) WEIGHTED FLUIDS FOR TREATMENT OF SUBTERRANEAN FORMATIONS

(71) Applicant: Halliburton Energy Services, Inc., Houston, TX (US)

(72) Inventor: Alan William Marr, Arbroath (GB)

(73) Assignee: Halliburton Energy Services, Inc., Houston, TX (US)

( * ) Notice: Subject to any disclaimer, the term of this patent is extended or adjusted under 35 U.S.C. 154(b) by 112 days.

(21) Appl. No.: 15/776,336

(22) PCT Filed: Dec. 2, 2016

(86) PCT No.: PCT/US2016/064726
§ 371 (c)(1),
(2) Date: May 15, 2018

(87) PCT Pub. No.: WO2017/116611
PCT Pub. Date: Jul. 6, 2017

(65) Prior Publication Data
US 2018/0298266 A1     Oct. 18, 2018

Related U.S. Application Data

(60) Provisional application No. 62/272,792, filed on Dec. 30, 2015.

(51) Int. Cl.
| C09K 8/00 | (2006.01) |
| E21B 43/00 | (2006.01) |
| C09K 8/05 | (2006.01) |
| C09K 8/504 | (2006.01) |
| C09K 8/74 | (2006.01) |
| C09K 8/84 | (2006.01) |

(52) U.S. Cl.
CPC .............. *C09K 8/05* (2013.01); *C09K 8/00* (2013.01); *C09K 8/5045* (2013.01); *C09K 8/74* (2013.01); *C09K 8/845* (2013.01); *E21B 43/00* (2013.01)

(58) Field of Classification Search
None
See application file for complete search history.

(56) References Cited

U.S. PATENT DOCUMENTS

| 6,632,779 B1 | 10/2003 | Vollmer et al. |
| 8,895,476 B2 | 11/2014 | McKennis et al. |
| 2003/0114319 A1 | 6/2003 | Verma et al. |
| 2008/0135302 A1* | 6/2008 | Zhang ............... C09K 8/06 175/70 |

(Continued)

FOREIGN PATENT DOCUMENTS

WO     86-01253     2/1986

OTHER PUBLICATIONS

International Search Report and Written Opinion for PCT/US2016/064726 dated Mar. 20, 2017.

*Primary Examiner* — Anuradha Ahuja
(74) *Attorney, Agent, or Firm* — Tenley Krueger; C. Tumey Law Group PLLC

(57) ABSTRACT

A method includes placing a weighted fluid in the subterranean formation. The weighted fluid includes calcium bromide. The weighted fluid includes one or more secondary salts that are each independently an inorganic bromide salt other than calcium bromide. The weighted fluid also includes water. The weighted fluid has a density at standard temperature and pressure of at least about 1.7 g/cm3.

15 Claims, 3 Drawing Sheets

(56) References Cited

U.S. PATENT DOCUMENTS

2012/0073813 A1     3/2012   Zamora et al.
2015/0045260 A1     2/2015   McKennis et al.
2017/0233630 A1*    8/2017   Nalepa .................... C09K 8/05
                                                          507/145

* cited by examiner

WEIGHTED FLUIDS FOR TREATMENT OF SUBTERRANEAN FORMATIONS

CROSS-REFERENCE TO RELATED APPLICATION

This application claims the benefit of priority to U.S. Provisional Patent Application Ser. No. 62/272,792 filed Dec. 30, 2015, the disclosure of which is incorporated herein in its entirety by reference.

BACKGROUND

Components of a completion fluid, such as inorganic salts, can enter a hydrocarbon producing formation and can contaminate the oil, gas, and water drawn therefrom. Certain contaminants in the produced hydrocarbon stream, such as zinc salts, can be unacceptable due to their effects on well, pipeline, or refinery operations. However, solutions containing zinc salts are commonly used as completion fluids. Although some zinc salt-free brines have high density, they exhibit crystallization temperatures that can be above the required working temperatures (e.g., less than 40° F. (4.44° C.)), thereby causing the brines to form precipitates. Mixtures including zinc bromide are often used to produce fluid high density and low crystallization temperatures. However, the use of such completion fluids causes zinc salt-contamination of the produced hydrocarbon stream.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
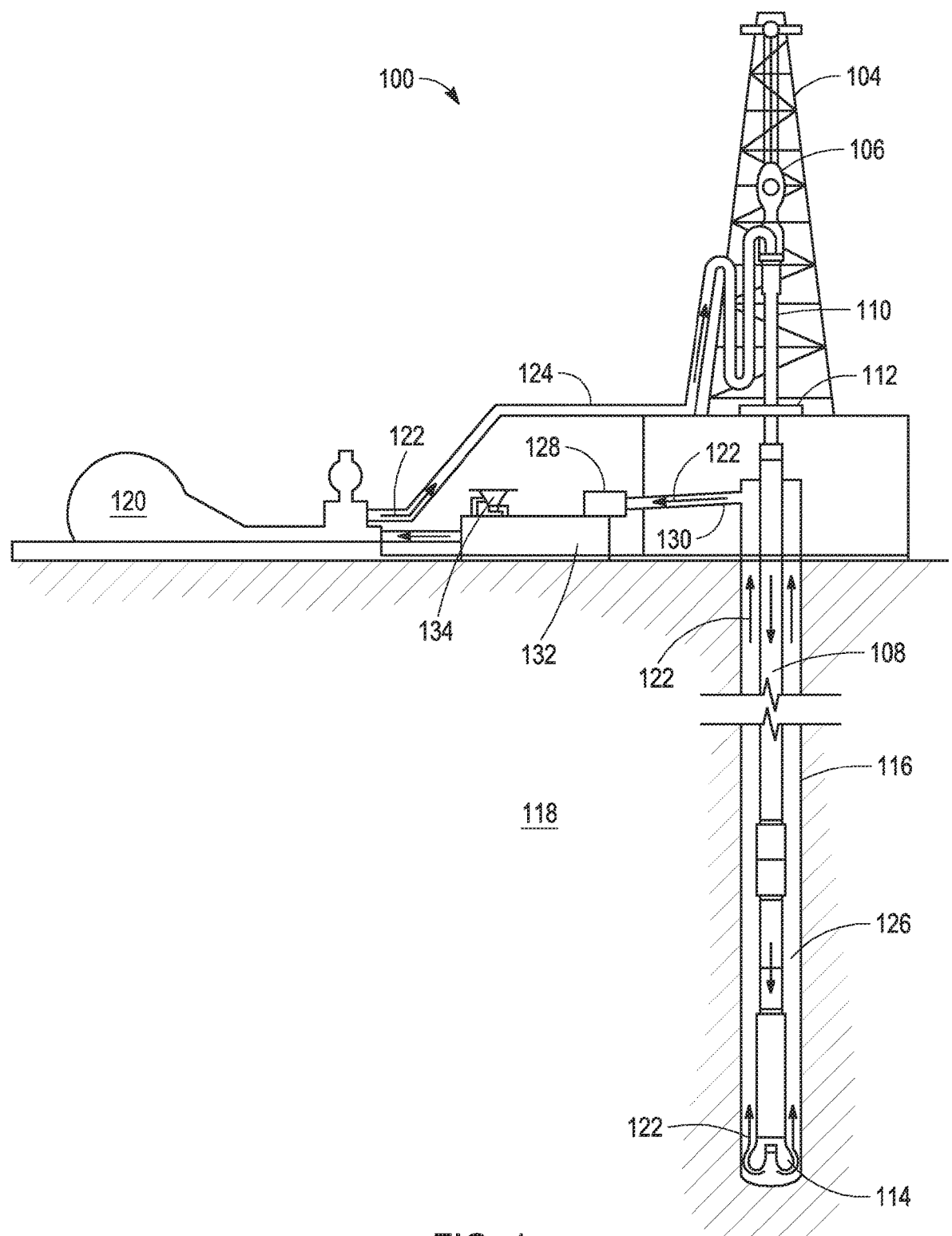
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are positive integers and mean having any of a to b number of carbon atoms. For example, (C$_1$-C$_4$)hydrocarbyl means the hydrocarbyl group can be methyl (C$_1$), ethyl (C$_2$), propyl (C$_3$), or butyl (C$_4$), and (C$_0$-C$_b$)hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "standard temperature and pressure" as used herein refers to 20° C. and 101 kPa.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well, and can also be called a "work-over fluid." Remedial treatments, also called work-over treatments, can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material," "disproportionate permeability modifier," or "relative permeability modifier," refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, the present invention provides a method of treating a subterranean formation. The method includes placing a weighted fluid in the subterranean formation. The weighted fluid includes calcium bromide. The weighted fluid includes one or more secondary salts that are each independently an inorganic bromide salt other than calcium bromide. The weighted fluid also includes water. The weighted fluid has a density at standard temperature and pressure of at least about 1.7 $g/cm^3$.

In various embodiments, the present invention provides a method of treating a subterranean formation. The method includes placing a weighted fluid in the subterranean formation. The weighted fluid includes calcium bromide, manganese bromide, and water. The weighted fluid has a density at standard temperature and pressure of about 1.7 $g/cm^3$ to about 2.2 $g/cm^3$. The weighted fluid has a crystallization temperature at standard pressure of about −35° C. to about −7° C. The weighted fluid has a pH of about 1 to about 4. The weighted fluid is substantially free of solids having a particle size of greater than about 1 micron. The weighted fluid is substantially free of elemental zinc and zinc salts.

In various embodiments, the present invention provides a system. The system includes a tubular disposed in a subterranean formation. The system also includes a pump configured to pump a weighted fluid in the subterranean formation through the tubular. The weighted fluid includes calcium bromide. The weighted fluid includes one or more secondary salts that are each independently an inorganic bromide salt other than calcium bromide. The weighted fluid also includes water. The weighted fluid has a density at standard temperature and pressure of at least about 1.7 g/cm$^3$.

In various embodiments, the present invention provides a weighted fluid for treatment of a subterranean formation. The weighted fluid includes calcium bromide. The weighted fluid includes one or more secondary salts that are each independently an inorganic bromide salt other than calcium bromide. The weighted fluid also includes water. The weighted fluid has a density at standard temperature and pressure of at least about 1.7 g/cm$^3$.

In various embodiments, the present invention provides a weighted fluid for treatment of a subterranean formation. The weighted fluid includes calcium bromide, manganese bromide, and water. The weighted fluid has a density at standard temperature and pressure of about 1.7 g/cm$^3$ to about 2.2 g/cm$^3$. The weighted fluid has a crystallization temperature at standard pressure of about −35° C. to about −7° C. The weighted fluid has a pH of about 1 to about 4. The weighted fluid is substantially free of solids having a particle size of greater than about 1 micron. The weighted fluid is substantially free of elemental zinc and zinc salts.

In various embodiments, the present invention provides a method of preparing a weighted fluid for treatment of a subterranean formation. The method includes forming a weighted fluid. The weighted fluid includes calcium bromide. The weighted fluid includes one or more secondary salts that are each independently an inorganic bromide salt other than calcium bromide. The weighted fluid also includes water. The weighted fluid has a density at standard temperature and pressure of at least about 1.7 g/cm$^3$.

In various embodiments, the weighted fluid and method of using the same has certain advantages over other weighted fluids, at least some of which are unexpected. For example, in some embodiments, the weighted fluid of the present invention can have a higher density than other weighted fluids, such as a higher density than other calcium bromide brine fluids, such as a density of about 14.3 lb/gal (1.7 g/cm$^3$) or higher. In some embodiments, the weighted fluid of the present invention can have a lower crystallization temperature than other weighted fluids, such as a crystallization temperature of less than about 20° F. (−6.7° C.).

In some embodiments, the weighted fluid of the present invention can be substantially free of solids. In some embodiments, the weighted fluid of the present invention can be substantially free of zinc salts. In some embodiments, the weighted fluid of the present invention can possess a high density without the use of zinc salts or suspended solids. In some embodiments, the weighted fluid of the present invention can have a higher density than other weighted fluids that are free of zinc salts and suspended solids. In some embodiments, the weighted fluid of the present invention can provide a low crystallization temperature without the use of zinc salts or suspended solids. In some embodiments, the weighted fluid of the present invention can provide a lower crystallization temperature, at standard pressure or at other pressures, than other weighted fluids that are free of zinc salts or suspended solids. In some embodiments, the weighted fluid of the present invention can provide an equivalent or higher hydrostatic pressure downhole for well control during completion operations.

In various embodiments, the weighted fluid of the present invention can provide a low corrosion rate when in contact with various metals. In some embodiments, the weighted fluid of the present invention can provide a lower corrosion rate when in contact with various metals as compared to other weighted fluids, such as compared to weighted fluids that are free of zinc salts or suspended solids. In various embodiments, the weighted fluid of the present invention can be in contact with corrosion resistant alloys and even mild steel for extended periods at relatively high temperatures without risk of damage to metal components.

In various embodiments, the weighted fluid of the present invention is compatible with a wide variety of materials. In some embodiments, the weighted fluid of the present invention can be combined with various materials without formation of a precipitate of crystalline solids, such as viscosifiers, produced water, iron-containing water (e.g., iron salts or elemental iron), and water-miscible alcohols such as methanol. In some embodiments, the weighted fluid can be conveniently reconditioned after use in a subterranean formation and reused.

Method of Treating a Subterranean Formation.

In some embodiments, the present invention provides a method of treating a subterranean formation. The method includes placing a weighted fluid in the subterranean formation. The weighted fluid can include calcium bromide, one or more secondary salts that are each independently an inorganic bromide salt other than calcium bromide, and water. The weighted fluid can have a density at standard temperature and pressure of at least about 1.7 g/cm$^3$.

In some embodiments, the weighted fluid can be placed in the subterranean formation neat. In some embodiments, the weighted fluid can be placed in the subterranean formation as a component of another composition. For example, a subterranean treatment fluid can include the weighted fluid, wherein the subterranean treatment fluid is a completion fluid, a workover fluid, a drilling fluid, a perforating fluid, a displacement fluid, a well suspension fluid, a packer fluid, or a combination thereof. The placing of the weighted fluid in the subterranean formation can including placing the subterranean treatment fluid that includes the weighted fluid in the subterranean formation. The method can include performing a subterranean formation treatment operation in the subterranean formation, such as using the subterranean treatment fluid that includes the weighted fluid, or using a subterranean treatment fluid that is free of the weighted fluid but with placement of the weighted fluid in the subterranean formation before or after placing the subterranean treatment fluid in the subterranean formation. The method can include performing in the subterranean formation hydraulic fracturing, stimulation, drilling, spotting, clean-up, completion, remedial treatment, abandonment, acidizing, cementing, packing, logging, or a combination thereof. The weighted fluid can be a completion fluid, and the method can include performing a completion operation in the subterranean operation using the weighted fluid.

The placing of the weighted fluid in the subterranean formation can include contacting the weighted fluid and any suitable part of the subterranean formation, or contacting the weighted fluid and a subterranean material, such as any suitable subterranean material. The subterranean formation can be any suitable subterranean formation. In some examples, the placing of the weighted fluid in the subterranean formation includes contacting the weighted fluid with or placing the weighted fluid in at least one of a fracture, at least a part of an area surrounding a fracture, a flow pathway, an area surrounding a flow pathway, and an area desired to be fractured. The placing of the weighted fluid in the subterranean formation can be any suitable placing and can include any suitable contacting between the subterranean formation and the weighted fluid. The placing of the weighted fluid in the subterranean formation can include at least partially depositing the weighted fluid in a fracture, flow pathway, or area surrounding the same.

In some embodiments, the method includes obtaining or providing the weighted fluid (e.g., mixing together various components of the weighted fluid to form the weighted fluid). The obtaining or providing of the weighted fluid can occur at any suitable time and at any suitable location. The obtaining or providing of the weighted fluid can occur above the surface (e.g., components of the weighted fluid can be combined above-surface to provide the weighted fluid above-surface). The obtaining or providing of the weighted fluid can occur in the subterranean formation (e.g., components of the weighted fluid can be combined downhole to provide the weighted fluid in the subterranean formation).

The calcium bromide and the one or more secondary salts can be provided prior to the onset of the method. In other embodiments, the method includes forming at least one of the calcium bromide and the one or more secondary salts, such as from inorganic oxides or hydroxides. Inorganic oxides or hydroxides that can be used to form an inorganic bromide salt can include one or more of calcium oxide or hydroxide, manganese oxides or hydroxides, tin(II) oxide or hydroxide, tin(IV) oxide or hydroxide, bismuth(III) oxide or hydroxide, indium(III) oxide or hydroxide, or mixtures of any two or more of the foregoing. When one or more inorganic oxides or hydroxides are used, the bromide source for forming an inorganic bromide during the process is hydrogen bromide, bromine, or a mixture thereof. In these mixtures, the hydrogen bromide and bromine can be in any desired proportions from 100% hydrogen bromide to 100% $B_{r2}$, or at any relative proportion therebetween. For convenience, it may be preferable to employ a mixture in which hydrogen bromide is present. When bromine (elemental bromine, $Br_2$) is used, either alone or in admixture with hydrogen bromide, a reducing agent can also be present, such as methanol, ethanol, formic acid, hydrazine, and the like.

The method can include performing a completion operation in the subterranean formation using the weighted fluid. Completion operations can be performed to bring a wellbore into production once drilling operations have been concluded. The weighted fluid can be placed in a well in the subterranean formation to facilitate final operations prior to initiation of production, such as setting screens, production liners, packers, downhole values, or shooting perforations into the producing zone. The weighted fluid can control the well, should downhole hardware fail, without damaging the producing formation or completion components.

The method can include hydraulic fracturing, such as a method of hydraulic fracturing to generate a fracture or flow pathway. The placing of the weighted fluid in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the weighted fluid in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the weighted fluid is placed in or contacted to, or the weighted fluid is placed in or contacted to an area surrounding the generated fracture or flow pathway.

The weighted fluid can be substantially free of elemental zinc and zinc salts. For example, the weighted fluid can be about 0 wt % to about 10 wt % elemental zinc, zinc salts, or a combination thereof, or about 0 wt % to about 2 wt %, or about 0 wt %, or about 0.001 wt % or less, or less than, equal to, or greater than about 0.01 wt %, 0.1, 0.2, 0.3, 0.4, 0.5, 0.6, 0.7, 0.8, 0.9, 1, 1.2, 1.4, 1.6, 1.8, 2, 2.5, 3, 3.5, 4, 5, 6, 7, 8, 9 wt %, or about 10 wt % or more.

The weighted fluid can be substantially free of solids. For example, about 0 wt % to about 10 wt % of the weighted fluid can be solids, or about 0 wt % to about 2 wt %, or about 0 wt %, or about 0.001 wt % or less, or less than, equal to, or greater than about 0.01 wt %, 0.1, 0.2, 0.3, 0.4, 0.5, 0.6, 0.7, 0.8, 0.9, 1, 1.2, 1.4, 1.6, 1.8, 2, 2.5, 3, 3.5, 4, 4.5, 5, 6, 7, 8, 9, or about 10 wt % or more. The solids can have any suitable particle size, wherein the particle size is the largest dimension of the particle, such as equal to or greater than about 1 nm, 1 micron, or equal to or greater than 1 mm. The particle size can be 1 nm or less, or less than, equal to, or greater than about 2 nm, 3, 4, 5, 6, 8, 10, 15, 20, 25, 50, 75, 100, 150, 200, 250, 500, 750 nm, 1 micron, 2, 3, 4, 5, 6, 8, 10, 15, 20, 25, 50, 75, 100, 150, 200, 250, 500, 750 microns, 1 mm, 2, 3, 4, 5, 6, 7, 8, 9 mm, or about 10 mm or more.

The weighted fluid can have any suitable density at standard temperature and pressure. For example, the weighted fluid can have a density at standard temperature and pressure of about 1.7 $g/cm^3$ to about 2.2 $g/cm^3$, about 1.75 $g/cm^3$ to about 2.10 $g/cm^3$, about 1.71 $g/cm^3$ to about 1.88 $g/cm^3$, or about 1.76 $g/cm^3$ to about 1.83 $g/cm^3$, or about 1.71 $g/cm^3$ or less, or less than, equal to, or greater than about 1.72 $g/cm^3$, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.11, 2.12, 2.13, 2.14, 2.15, 2.16, 2.17, 2.18, 2.19 $g/cm^3$, or about 2.20 $g/cm^3$ or more, or about 1.710 $g/cm^3$ or less, or less than, equal to, or greater than about 1.720 $g/cm^3$, 1.725, 1.730, 1.735, 1.740, 1.745, 1.750, 1.755, 1.760, 1.765, 1.770, 1.775, 1.780, 1.785, 1.790, 1.795, 1.800, 1.805, 1.810, 1.815, 1.820, 1.825, 1.830, 1.835, 1.840, 1.845, 1.80, 1.855, 1.860, 1.865, 1.870 $g/cm^3$, or about 1.880 $g/cm^3$ or more.

The weighted fluid can have any suitable crystallization temperature, wherein the crystallization temperature is the temperature at which crystals begin to form. At standard pressure, the weighted fluid can have a crystallization temperature of less than about −6.7° C., or about −35° C. to about −7° C., or about −31° C. to about −7.3° C., or about −6.7° C. or more, or more than, equal to, or less than about −7.0, −7.5, −8.0, −8.5, −9.0, −9.5, −10.0, −10.5, −11.0, −11.5, −12.0, −12.5, −13.0, −13.5, −14.0, −14.5, −15.0, −15.5, −16.0, −16.5, −17.0, −17.5, −18.0, −18.5, −19.0, −19.5, −20.0, −20.5, −21.0, −21.5, −22.0, −22.5, −23.0, −23.5, −24.0, −24.5, −25.0, −25.5, −26.0, −26.5, −27.0, −27.5, −28.0, −28.5, −29.0, −29.5, −30.0, −30.5, −31.0, −31.5, −32.0, −32.5, −33.0, −33.5, −34.0, −34.5° C., or about −35.0° C. or less. Herein, with respect to negative numbers, "less" indicates a more negative number. For example, −6 is less than −5.

The weighted fluid can have any suitable crystallization temperature at pressures other than standard pressure. For example, at a pressure of about 34.5 MPa to about 137.9 MPa (e.g., about 34.5 MPa, 68.9 MPa, 103.4 MPa, 137.9 MPa, or about 34.5 MPa or less, or less than, equal to, or more than about 35 MPa, 40, 45, 50, 55, 60, 65, 70, 75, 80, 85, 90, 95, 100, 105, 110, 115, 120, 125, 130, 135 MPa, or about 137.9 MPa or more), the weighted fluid can have a crystallization temperature of less than about −6.7° C., or about −35° C. to about −7° C., about −6.1° C. to about −27.7° C., −13.2° C. to about −23.7° C., or about −6.1° C. or less, or more than, equal to, or less than about −7.0° C., −7.5, −8.0, −8.5, −9.0, −9.5, −10.0, −10.5, −11.0, −11.5, −12.0, −12.5, −13.0, −13.5, −14.0, −14.5, −15.0, −15.5, −16.0, −16.5, −17.0, −17.5, −18.0, −18.5, −19.0, −19.5, −20.0, −20.5, −21.0, −21.5, −22.0, −22.5, −23.0, −23.5, −24.0, −24.5, −25.0, −25.5, −26.0, −26.5, −27.0, −27.5, −28.0, −28.5, −29.0, −29.5, −30.0, −30.5, −31.0, −31.5, −32.0, −32.5, −33.0, −33.5, −34.0, −34.5° C., or about −35.0° C. or less.

In some embodiments, the weighted fluid has a density at standard temperature and pressure of about 1.8 g/cm$^3$. The weighted fluid can have a crystallization temperature at standard pressure of about −27.6° C. At a pressure of about 34.5 MPa to about 137.9 MPa (e.g., about 34.5 MPa, 68.9 MPa, 103.4 MPa, 137.9 MPa, or about 34.5 MPa or less, or less than, equal to, or more than about 35 MPa, 40, 45, 50, 55, 60, 65, 70, 75, 80, 85, 90, 95, 100, 105, 110, 115, 120, 125, 130, 135 MPa, or about 137.9 MPa or more), the weighted fluid can have a crystallization temperature of about −13.2° C. to about −23.7° C., or about −13.2° C. or less, or about −13.0, −13.5, −14.0, −14.5, −15.0, −15.5, −16.0, −16.5, −17.0, −17.5, −18.0, −18.5, −19.0, −19.5, −20.0, −20.5, −21.0, −21.5, −22.0, −22.5, −23.0, −23.5° C., or about −23.7° C. or less.

The weighted fluid can have any suitable pH. In some embodiments, the weighted fluid has a pH of about 1 to about 7, about 1 to about 6, about 1 to about 4, about 2 to about 4, or about 1 or less, or less than, equal to, or greater than about 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.2, 6.4, 6.6, 6.8, or about 7 or more. The pH of the fluid can be set or adjusted by one or more acids or bases. The one or more acids can be as mineral acids or organic acids that are water-soluble. Suitable mineral acids can include hydrogen chloride, hydrogen bromide, hydrogen iodide, nitric acid, sulfuric acid, phosphoric acid, and the like. Suitable organic acids can include formic acid, tartaric acid, citric acid, gluconic acid, lactic acid, malic acid, maleic acid, malonic acid, oxalic acid, and the like. Mixtures of any two or more acids can be employed if desired. Hydrogen bromide can be used in gaseous form, or, preferably, as an aqueous solution. The amount of formic acid, when present, is typically about 500 ppm to about 5000 ppm relative to the total weight of the weighted fluid, about 750 ppm to about 3000 ppm, about 1000 ppm to about 2500 ppm, or about 500 ppm or less, or less than, equal to, or greater than about 600, 800, 1,000, 1,200, 1,400, 1,600, 1,800, 2,000, 2,200, 2,400, 2,600, 2,800, 3,000, 3,200, 3,400, 3,600, 3,800, 4,000, 4,200, 4,400, 4,600, 4,800 ppm, or about 5,000 ppm or more. The base can include one or more inorganic oxides or hydroxides.

The weighted fluid can include an inorganic oxide or hydroxide. In some instances, upon introduction of an inorganic oxide or hydroxide to a zinc-free aqueous brine, a precipitate may form; after filtration, a clear aqueous brine can be obtained. Suitable inorganic oxides and hydroxides can include oxides and hydroxides of manganese(II), tin(II), tin(IV), bismuth(III), indium(III), alkali metals including lithium, sodium, and potassium, alkaline earth metals including calcium and magnesium, and mixtures of any of these oxides or hydroxides. In some embodiments, the inorganic oxide(s) and/or hydroxide(s) has one or more of the same cations already present in the aqueous brine. In some embodiments, a small amount of precipitate forms when an inorganic oxide and/or hydroxide is added (e.g., to increase the pH). Once the precipitate has been removed, e.g., by filtration, additional precipitate formation usually does not occur.

The water can be any suitable water. The water can be fresh water, brine, produced water, flowback water, brackish water, sea water, or a combination thereof. Any suitable proportion of the weighted fluid can be water, such as about 0.001 wt % to about 99.999 wt % of the weighted fluid, or about 10 wt % to about 90 wt % of the weighted fluid, or about 0.001 wt % or less, or less than, equal to, or greater than about 0.01 wt %, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or 99.999 wt % or more.

For a salt water used to generate the weighted fluid, the one or more salts therein can be any suitable salt, such as at least one of NaBr, CaCl$_2$, CaBr$_2$, ZnBr$_2$, KCl, NaCl, a carbonate salt, a sulfonate salt, sulfite salts, sulfide salts, a phosphate salt, a phosphonate salt, a magnesium salt, a bromide salt, a formate salt, an acetate salt, and a nitrate salt. The water can have any suitable total dissolved solids level, such as about 1,000 mg/L to about 250,000 mg/L, or about 1,000 mg/L or less, or about 0 mg/L, or about 5.000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The water can have any suitable salt concentration, such as about 1,000 ppm to about 300,000 ppm, or about 1,000 ppm to about 150,000 ppm, or about 0 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the water can have a concentration of at least one of NaBr, CaCl$_2$, CaBr$_2$, ZnBr$_2$, KCl, and NaCl of about 0.1% w/v to about 20% w/v, or about 0%, or about 0.1% w/v or less, or about 0.5% w/v, 1, 2, 3, 4, 5, 6, 7, 8, 9, 10, 1, 12, 13, 14, 15, 16, 17, 18, 19, 20, 21, 22, 23, 24, 25, 26, 27, 28, 29, or about 30% w/v or more.

The calcium bromide can be any suitable proportion of the weighted fluid. For example, the calcium bromide can be about 0.1 wt % to about 99.9 wt % of the weighted fluid, or about 1 wt % to about 50 wt %, or about 20 wt % to about 50 wt %, or about 0.1 wt % or less, or less than, equal to, or greater than about 1 wt %, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 wt %, or about 99.9 wt % or more.

The one or more secondary salts can each independently be any suitable bromide salt other than calcium bromide. The one or more secondary salts can each be independently selected from the group consisting of manganese bromide, tin(II) bromide, tin(IV) bromide, bismuth bromide, and indium bromide. The one or more secondary salts can be manganese bromide. The one or more secondary salts can be only manganese bromide, such that the one or more secondary salts are free of materials other than manganese bromide. The one or more secondary salts can be any suitable proportion of the weighted fluid, such as about 0.1 wt % to about 99.9 wt % of the weighted fluid, about 1 wt % to about 50 wt %, about 5 wt % to about 45 wt %, or about 0.1 wt % or less, or less than, equal to, or greater than about 1 wt %, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 wt %, or about 99.9 wt % or more.

The combined calcium bromide and one or more secondary salts can form any suitable proportion of the weighted fluid, such as about 0.1 wt % to about 99.9 wt % of the weighted fluid, about 45 wt % to about 70 wt %, about 15 wt % to about 60 wt %, about 20 wt % to about 55 wt %, about 1 wt % to about 50 wt %, or about 0.1 wt % or less, or less than, equal to, or greater than about 1 wt %, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 wt %, or about 99.9 wt % or more.

The weighted fluid can have any suitable mass ratio of the calcium bromide to the one or more secondary salts, such as about 1000:1 to about 1:1000, about 10:1 to about 1:10, about 10:1 to about 0.4:1, or about 1000:1 or more, or more than, equal to, or less than about 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 90:1, 80:1, 70:1, 60:1, 50:1, 45:1, 40:1, 35:1, 30:1, 25:1, 20:1, 18:1, 16:1, 14:1, 12:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:12, 1:14, 1:16, 1:18, 1:20, 1:25, 1:30, 1:35, 1:40, 1:45, 1:50, 1:60, 1:70, 1:80, 1:90, 1:100, 1:150, 1:200, 1:250, 1:300, 1:350, 1:400, 1:450, 1:500, 1:550, 1:600, 1:650, 1:700, 1:750, 1:800, 1:850, 1:900, 1:950, or about 1:1000 or less.

In some embodiments, the weighted fluid can be substantially free of materials other than the calcium bromide, the one or more secondary salts, an optional acid, and the water. For example, about 0 wt % to about 10 wt % of the weighted fluid can be materials other than the calcium bromide, the one or more secondary salts, an optional acid, and the water, or about 0 wt % to about 2 wt %, or about 0 wt %, or about 0.001 wt % or less, or less than, equal to, or greater than about 0.01 wt %, 0.1, 0.2, 0.3, 0.4, 0.5, 0.6, 0.7, 0.8, 0.9, 1, 1.2, 1.4, 1.6, 1.8, 2, 2.5, 3, 3.5, 4, 4.5, 5, 6, 7, 8, 9 wt %, or about 10 wt % or more.

In an embodiment wherein the one or more secondary salts are at least one of manganese bromide, tin(II) bromide, tin(IV) bromide, and indium bromide, the weighted fluid can be substantially free of materials other than the calcium bromide, the manganese bromide, tin(II) bromide, the tin (IV) bromide, the indium bromide, an optional acid, and the water. For example, about 0 wt % to about 10 wt % of the weighted fluid can be materials other than the calcium bromide, the manganese bromide, tin(II) bromide, the tin (IV) bromide, the indium bromide, an optional acid, and the water, or about 0 wt % to about 2 wt %, or about 0 wt %, or about 0.001 wt % or less, or less than, equal to, or greater than about 0.01 wt %, 0.1, 0.2, 0.3, 0.4, 0.5, 0.6, 0.7, 0.8, 0.9, 1, 1.2, 1.4, 1.6, 1.8, 2, 2.5, 3, 3.5, 4, 4.5, 5, 6, 7, 8, 9 wt %, or about 10 wt % or more.

Manganese(II) bromide can be used in combination with one or more other water-soluble inorganic salts selected from an inorganic bromide salt, manganese(II) nitrate, and a water-soluble polytungstate salt. In some embodiments, when two secondary bromide salts are used in addition to the calcium bromide, they can be a combination of calcium bromide, manganese(II) bromide and tin(IV) bromide, or a combination of calcium bromide, manganese(II) bromide, and bismuth(III) bromide.

The weighted fluid can include manganese(II) nitrate. The manganese(II) nitrate can be any suitable proportion of the weighted fluid, such as about 5 wt % to about 75 wt % of the weighted fluid, about 35 wt % to about 70 wt %, about 10 wt % to about 50 wt %, or about 5 wt % or less, or less than, equal to, or greater than about 6 wt %, 8, 10, 12, 14, 16, 18, 20, 25, 30, 35, 40, 45, 50, 55, 60, 65, 70 wt %, or about 75 wt % or more.

The weighted fluid can include one or more water-soluble polytungstate salts. The one or more water-soluble polytungstate salts can be at least one of an alkali metal polytungstate, an alkaline earth metal polytungstate, manganese polytungstate, and the like. Alkali metal polytungstates can include lithium polytungstate, lithium metatungstate, sodium polytungstate, sodium metatungstate, potassium polytungstate, potassium metatungstate, and the like. Alkaline earth metal polytungstates can include calcium polytungstate, magnesium polytungstate, and strontium polytungstate; preferred alkaline earth polytungstates include calcium polytungstate. The term "metatungstate" can refer to a hydrated form of a polytungstate salt. The one or more water-soluble polytungstate salts can be any suitable proportion of the weighted fluid, such as about 5 wt % to about 40 wt %, about 10 wt % to about 35 wt %, or about 5 wt % or less, or less than, equal to, or greater than about 10, 15, 20, 25, 30, 35 wt %, or about 40 or more.

The weighted fluid can include glycerol. In some embodiments, glycerol in manganese-containing aqueous brines can prevent, reduce, or minimize precipitation, such as at pH values of about 3.5 or above. The glycerol can be any suitable proportion of the weighted fluid, such as about 3 wt % to about 15 wt %, or about 5 wt % or about 10 wt %, or 3 wt % or less, or less than, equal to, or greater than about 4 wt %, 5, 6, 7, 8, 9, 10, 11, 12, 13, 14 wt %, or about 15 wt % or more.

Other Components.

The weighted fluid, or a mixture including the weighted fluid, can include any suitable additional component in any suitable proportion, such that the weighted fluid, or mixture including the same, can be used as described herein. Any component listed in this section can be present or not present in the weighted fluid or a mixture including the same.

The weighted fluid, or a mixture including the weighted fluid, can include a secondary weighting agent, such as one secondary weighting agent, or more than one secondary weighting agent. The secondary weighting agent can be any suitable secondary weighting agent. The secondary weighting agent can be a hard mineral, a metal oxide, metal particles, a metal alloy, $Al_2O_3$, $Al_2SiO_5$, $BiO_3$, $Bi_2O_3$, $CaSO_4$, $CaPO_4$, $CdS$, $Ce_2O_3$, $(Fe,Mg)Cr_2O_4$, $Cr_2O_3$, $CuO$, $Cu_2O$, $Cu_2(AsO_4)(OH)$, $CuSiO_3 \cdot H_2O$, $Fe_3Al_2(SiO_4)_3$, $Fe^{2+}Al_2O_4$, $Fe_2SiO_4$, $FeCO_3$, $Fe_2O_3$, $\alpha\text{-}Fe_2O_3$, $\alpha\text{-}FeO(OH)$, $Fe_3O_4$, $FeTiO_3$, $(Fe,Mg)SiO_4$, $(Mn,Fe,Mg)(Al,Fe)_2O_4$, $CaFe^{2+}_2Fe^{3+}Si_2O_7O(OH)$, $(YFe^{3+}Fe^{2+}U, Th, Ca)_2(Nb,Ta)_2O_8$, $MgO$, $Mn_2SiO_4$, $Mn(II)_3Al_2(SiO_4)_3$, $(Na_{0.3}Ca_{0.1}K_{0.1})$ $(Mn^{4+},Mn^{3+})_2O_4 \cdot 1.5H_2O$, $(Mn,Fe)_2O_3$, $(Mn^{2+},Fe^{2+},Mg)(Fe^{3+},Mn^{3+})_2O_4$, $(Mn^{2+},Mn^{3+})_6[(O_8)(SiO_4)]$, $Ca(Mn^{3+},Fe^{3+})_{14}SiO_{24}$, $Ba(Mn^{2+})(Mn^{4+})_8O_{16}(OH)_4$, $CaMoO_4$, $MoO_2$, $MoO$, $NbO_4$, $(Na,Ca)_2Nb_2O_6(OH,F)$, $(Y,Ca,Ce,U,Th)(Nb,Ta,Ti)_2O_6$, $(Y,Ca,Ce,U,Th)(Ti,Nb,Ta)_2O_6$, $(Fe,Mn)(Ta,Nb)_2O_6$, $(Ce,La,Ca)BSiO_5$, $(Ce,La)CO_3F$, $(Y,Ce)CO_3F$, $MnO$, $MnO_2$, $Mn_2O_3$, $Mn_3O_4$, $Mn_2O_7$, $MnO(OH)$, $(Mn^{2+},Mn^{3+})_2O_4$, $NiO$, $NiAs_2$, $NiAs$, $NiAsS$, $Ni_2Fe$ to $Ni_3Fe$, $(Ni,Co)_3S_4$, $PbSiO_3$, $PbCO_3$, $(PbCl)_2CO_3$, $Pb^{2+}2Pb^{4+}O4$, $PbCu[(OH)_2(SO_4)]$, $(Sb^{3+},Sb^{5+})O_4$, $Sb_2SnO_5$, $Sc_2O_3$, $SnO$, $SnO_2$, $Cu_2FeSnS_4$, $SrO$, $SrSO_4$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $ZnCO_3$, $ZnO$, $ZnFe_2O_4$, $ZnA_2O_4$, $ZnCO_3$, $ZnO$, $ZrSiO_4$, $ZrO_2$, $ZrSiO_4$, allemontite, altaite, aluminum oxide, anglesite, tin oxide, antimony trioxide, awaruite, barium sulfate, bastnaesite, beryllium oxide, bimessite, bismite, bismuth oxycarbonates, bismuth oxychloride, bismuth trioxide, bismuth (III) oxide, bixbyite, bournonite, braunite, brucite, cadimum sulfide, calayerite, calcium oxide, calcium carbonate, cassiterite, cerium oxide, cerussite, chromium oxide, clinoclase, columbite, copper, copper oxide, corundum, crocoite, cuprite, dolomite, euxenite, fergusonite, franklinite, gahnite, geothite, greenockite, hausmmanite, hematite, hercynite, hessite, ilvaite, Jacobsite, magnesium oxide, manganite, manganosite, magnetite, manganese dioxide, manganese (IV) oxide, manganese oxide, manganese tetraoxide, manganese (II) oxide, manganese (III) oxide, microlite, minium, molybdenum (IV) oxide, molybdenum oxide, molybdenum trioxide, nickel oxide, pearceite, phosgenite, psilomelane, pyrochlore, pyrolusite, rutile, scandium oxide, siderite, smithsonite, spessartite, stillwellite, stolzite, strontium oxide, tantalite, tenorite, tephroite, thorianite, thorite, tin dioxide, tin (II) oxide, titanium dioxide, vanadium oxide, vanadium trioxide, vanadium (IV) oxide, vanadium (V) oxide, witherite, wulfenite, yttrium oxide, zincite, zircon, zirconium oxide, zirconium silicate, zinc oxide, an inorganic bromide salt, zinc bromide, or a combination thereof. The secondary weighting agent can be zinc bromide. In some embodiments, the weighted fluid can also include an acid such as formic acid to maintain a suitably low pH to prevent precipitation (e.g., when a zinc salt such as zinc bromide is included, or when zinc salts are absent). The one or more secondary weighting agents can form any suitable proportion of the weighted fluid or a mixture including the same, such as about 0 wt % to about 50 wt %, or about 0 wt % to about 20 wt %, or about 0 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

The weighted fluid, or a mixture including the weighted fluid, can include one or more acids. The acid can be any suitable acid. The acid can be hydrobromic acid, hydrochloric acid, sulfuric acid, nitric acid, hydrofluoric acid, acetic acid, formic acid, or a combination thereof. The acid can be formic acid. The one or more acids can form any suitable proportion of the weighted fluid or a mixture including the same, such as about 0 wt % to about 50 wt %, or about 0 wt % to about 20 wt %, or about 0 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

The weighted fluid, or a mixture including the weighted fluid, can include one or more corrosion inhibitors. The corrosion inhibitor can be any suitable corrosion inhibitor. The corrosion inhibitor can be a sulfur compound, a molybdate, a chromate, a nitrate, or a combination thereof. The one or more corrosion inhibitors can form any suitable proportion of the weighted fluid or a mixture including the same, such as about 0 wt % to about 50 wt %, or about 0 wt % to about 20 wt %, or about 0 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

The weighted fluid, or a mixture including the weighted fluid, can include one or more oxygen scavengers. The oxygen scavenger can be any suitable oxygen scavenger. The one or more oxygen scavengers can form any suitable proportion of the weighted fluid or a mixture including the same, such as about 0 wt % to about 50 wt %, or about 0 wt % to about 20 wt %, or about 0 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

The weighted fluid, or a mixture including the weighted fluid, can include one or more sulfide scavengers. The sulfide scavenger can be any suitable sulfide scavenger. The one or more sulfide scavengers can form any suitable proportion of the weighted fluid or a mixture including the same, such as about 0 wt % to about 50 wt %, or about 0 wt % to about 20 wt %, or about 0 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

The weighted fluid, or a mixture including the weighted fluid, can include one or more biocides. The biocide can be any suitable biocide. The one or more biocides can form any suitable proportion of the weighted fluid or a mixture including the same, such as about 0 wt % to about 50 wt %, or about 0 wt % to about 20 wt %, or about 0 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

The weighted fluid, or a mixture including the weighted fluid, can include one or more lubricants. The lubricant can be any suitable lubricant. The lubricant can form any suitable proportion of the weighted fluid or a mixture including the same, such as about 0 wt % to about 50 wt %, or about 0 wt % to about 20 wt %, or about 0 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

The weighted fluid, or a mixture including the weighted fluid, can include one or more bridging solids. The bridging solids can be any suitable bridging solids. The one or more bridging solids can form any suitable proportion of the weighted fluid or a mixture including the same, such as about 0 wt % to about 50 wt %, or about 0 wt % to about 20 wt %, or about 0 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

In some embodiments, the weighted fluid or a mixture including the same includes one or more viscosifiers. The viscosifier can be any suitable viscosifier. The viscosifier can affect the viscosity of the weighted fluid or a solvent that contacts the weighted fluid at any suitable time and location. In some embodiments, the viscosifier provides an increased viscosity at least one of before injection into the subterranean formation, at the time of injection into the subterranean formation, during travel through a tubular disposed in a borehole, once the weighted fluid reaches a particular subterranean location, or some period of time after the weighted fluid reaches a particular subterranean location. In some embodiments, the viscosifier can be about 0.000,1 wt % to about 10 wt % of the weighted fluid or a mixture including the same, about 0.004 wt % to about 0.01 wt %, or about 0.000,1 wt % or less, or less than, equal to, or greater than about 0.000,5 wt %, 0.001, 0.005, 0.01, 0.05, 0.1, 0.5, 1, 2, 3, 4, 5, 6, 7, 8, 9, or about 10 wt % or more of the weighted fluid or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide and a poly(($C_2$-$C_{10}$)alkene), wherein the ($C_2$-$C_{10}$)alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly (vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid citraconic acid, styrene sulfonic acid allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen-containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the weighted fluid or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenyl-benzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the weighted fluid or a mixture including the same, about 0.001 wt % to about 0.01 wt %, or about 0.000,01 wt % or less, or less than, equal to, or greater than about 0.000,05 wt %, 0.000,1, 0.000,5, 0.001, 0.005, 0.01, 0.05, 0.1, 0.5, 1, 2, 3, 4, or about 5 wt % or more.

In some embodiments, the weighted fluid or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the weighted fluid or a mixture including the same, or about 0.01 wt % to about 5 wt %, or about 0.001 wt % or less, or less than, equal to, or greater than about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The weighted fluid, or a mixture including the weighted fluid, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the weighted fluid, or a mixture including the same, or about 0.001 wt % or less, or less than, equal to, or greater than about 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The weighted fluid or a mixture including the same can include any suitable downhole fluid. The weighted fluid can be combined with any suitable downhole fluid before, during, or after the placement of the weighted fluid in the subterranean formation or the contacting of the weighted fluid and the subterranean material. In some examples, the weighted fluid is combined with a downhole fluid above the surface, and then the combined composition is placed in a subterranean formation or contacted with a subterranean material, and used as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof. In another example, the weighted fluid is injected into a subterranean formation to combine with a downhole fluid, and the combined composition is contacted with a subterranean material or is considered to be placed in the subterranean formation. The placement of the weighted fluid in the subterranean formation can include contacting the subterranean material and the mixture. Any suitable weight percent of the weighted fluid or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or less than, equal to, or greater than about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the weighted fluid or mixture including the same.

In some embodiments, the weighted fluid, or a mixture including the same, can include any suitable amount of any suitable material used in a downhole fluid. For example, the weighted fluid or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the weighted fluid or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity, TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the weighted fluid or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOP-PIT™, PLUG-GIT®, BARACARB®, DUO-SQUEEZE®, BAROFIBRE™, STEELSEAL®, and HYDRO-PLUG® lost circulation management materials. Any suitable proportion of the weighted fluid or mixture including the weighted fluid can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or less than, equal to, or greater than about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the weighted fluid or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the weighted fluid or a mixture including the same in any suitable amount, such as about 1 wt % or less, or less than, equal to, or greater than about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum, laponite gels, geltones, sepiolite gel, TAU-MOD®). Any ingredient listed in this paragraph can be either present or not present in a mixture including the weighted fluid.

An oil-based drilling fluid or mud in embodiments of the present invention can be any suitable oil-based drilling fluid. In various embodiments, the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The weighted fluid can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing weighted fluid of embodiments of the present invention as deemed appropriate by one skilled in the art, with the benefit of this disclosure. Any optional ingredient listed in this paragraph can be either present or not present in the weighted fluid or a mixture including the same. For example, the weighted fluid can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the weighted fluid or mixture including the same can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, formation cuttings (e.g., reinjected), hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.0001 mm to about 3 mm, about 0.015 mm to about 2.5 mm, about 0.025 mm to about 0.43 mm, about 0.043 mm to about 0.85 mm, about 0.085 mm to about 1.18 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The weighted fluid or mixture can include any suitable amount of proppant, such as about 0.01 wt % to about 99.99 wt %, about 0.1 wt % to about 80 wt %, about 10 wt % to about 60 wt %, or about 0.01 wt % or less, or less than, equal to, or greater than about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the weighted fluid can directly or indirectly affect one or more components or pieces of equipment associated with the preparation, delivery, recapture, recycling, reuse, and/or disposal of the disclosed weighted fluid. For example, and with reference to FIG. 1, the disclosed weighted fluid can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The weighted fluid can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the weighted fluid can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the weighted fluid can be stored, reconditioned, and/or regulated until added to the drilling fluid 122.

As mentioned above, the weighted fluid can directly or indirectly affect the components and equipment of the drilling assembly 100. For example, the weighted fluid can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the weighted fluid.

The weighted fluid can directly or indirectly affect the pump 120, which representatively includes any conduits, pipelines, trucks, tubulars, and/or pipes used to fluidically convey the weighted fluid to the subterranean formation; any pumps, compressors, or motors (e.g., topside or downhole) used to drive the weighted fluid into motion; any valves or related joints used to regulate the pressure or flow rate of the weighted fluid; and any sensors (e.g., pressure, temperature, flow rate, and the like), gauges, and/or combinations thereof, and the like. The weighted fluid can also directly or indirectly affect the mixing hopper 134 and the retention pit 132 and their assorted variations.

The weighted fluid can also directly or indirectly affect the various downhole or subterranean equipment and tools that can come into contact with the weighted fluid such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The weighted fluid can also directly or indirectly affect any downhole heat exchangers, valves, and corresponding actuation devices, tool seals, packers, other wellbore isolation devices or components, and the like associated with the wellbore 116. The weighted fluid can also directly or indirectly affect the drill bit 114, which can include roller cone bits, polycrystalline diamond compact (PDC) bits, natural diamond bits, hole openers, reamers, coring bits, and the like.

While not specifically illustrated herein, the weighted fluid can also directly or indirectly affect any transport or delivery equipment used to convey the weighted fluid to the drilling assembly 100 such as, for example, any transport vessels, conduits, pipelines, trucks, tubulars, and/or pipes used to fluidically move the weighted fluid from one location to another; any pumps, compressors, or motors used to drive the weighted fluid into motion; any valves or related joints used to regulate the pressure or flow rate of the weighted fluid; and any sensors (e.g., pressure and temperature), gauges, and/or combinations thereof, and the like.
System or Apparatus.

In various embodiments, the present invention provides a system. The system can be any suitable system that can use or that can be generated by use of an embodiment of the weighted fluid described herein in a subterranean formation, or that can perform or be generated by performance of a method for using the weighted fluid described herein. The system can include a weighted fluid. The system can also include a subterranean formation including the weighted fluid therein. In some embodiments, the system can include a mixture of the weighted fluid and downhole fluid. In some embodiments, the system can include a tubular, and a pump configured to pump the weighted fluid into the subterranean formation through the tubular.

In various embodiments, the present invention provides a system that includes a tubular disposed in a subterranean formation. The system also can include a pump configured to pump a weighted fluid in the subterranean formation through the tubular. The weighted fluid can include calcium bromide, one or more secondary salts that are each independently an inorganic bromide salt other than calcium bromide, and water. The weighted fluid can have a density at standard temperature and pressure of at least about 1.7 g/cm$^3$.

Various embodiments provide systems and apparatus configured for delivering the weighted fluid described herein to a subterranean location and for using the weighted fluid therein, such as for a completion operation, a drilling operation, a workover operation, a perforating operation, a displacement operation, a well suspension operation, a packing operation, or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a weighted fluid.

In some embodiments, the system can include a drill string disposed in a wellbore, with the drill string including a drill bit at a downhole end of the drill string. The system can also include an annulus between the drill string and the wellbore. The system can also include a pump configured to circulate the weighted fluid through the drill string, through the drill bit, and back above-surface through the annulus. In some embodiments, the system can include a fluid processing unit configured to process the weighted fluid exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the weighted fluid to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the weighted fluid to the high pressure pump. In such embodiments, the low pressure pump can "step up" the pressure of the weighted fluid before it reaches the high pressure pump.

In some embodiments, the systems or apparatuses described herein can further include a mixing tank that is upstream of the pump and in which the weighted fluid is formulated. In various embodiments, the pump (e.g., a low pressure pump, a high pressure pump, or a combination thereof) can convey the weighted fluid from the mixing tank or other source of the weighted fluid to the tubular. In other embodiments, however, the weighted fluid can be formulated offsite and transported to a worksite, in which case the weighted fluid can be introduced to the tubular via the pump directly from its shipping container (e.g., a truck, a railcar, a barge, or the like) or from a transport pipeline. In either case, the weighted fluid can be drawn into the pump, elevated to an appropriate pressure, and then introduced into the tubular for delivery to the subterranean formation.

Figure 2:
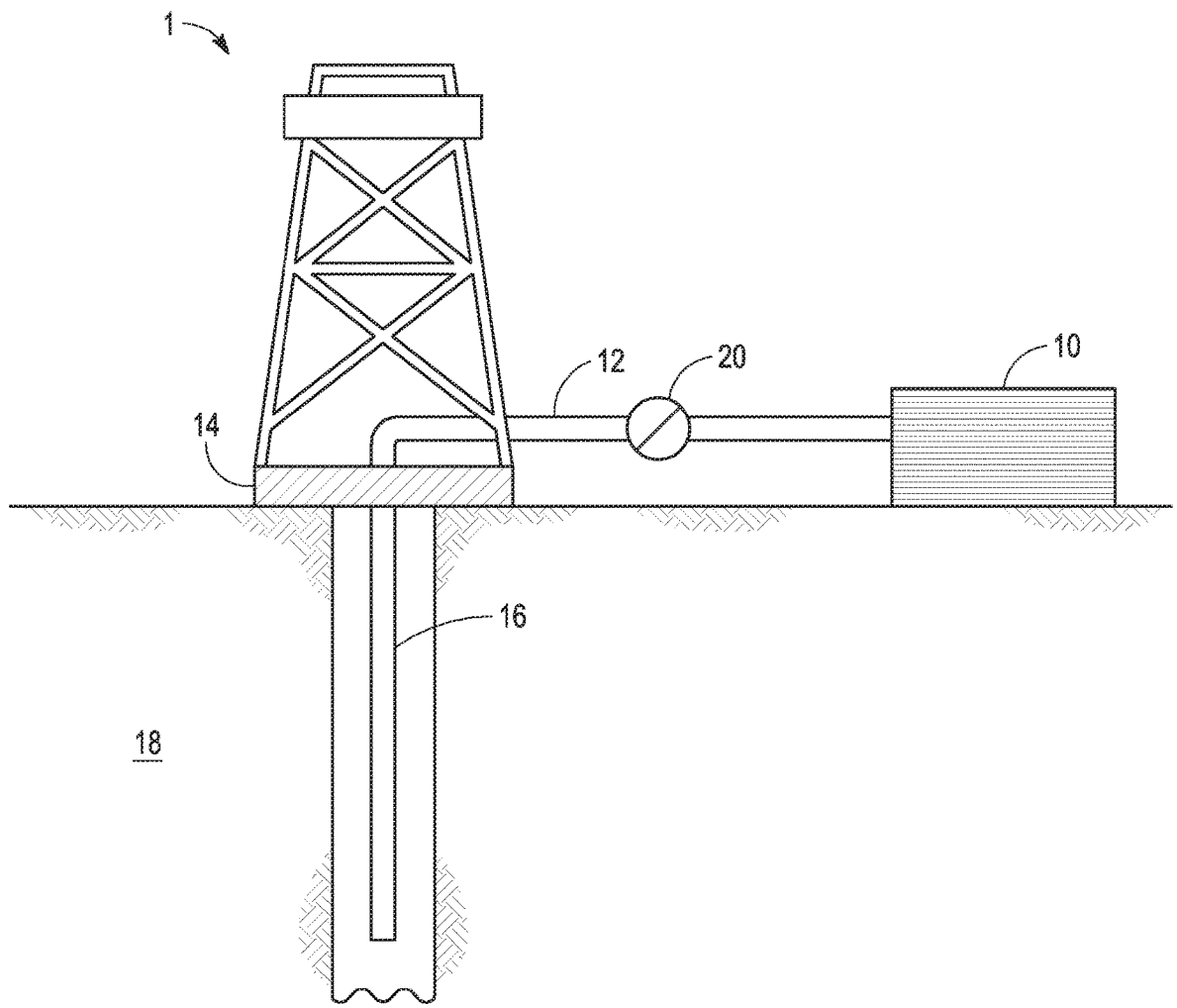
FIG. 2 illustrates a system or apparatus for delivering a composition to a subterranean formation, in accordance with various embodiments.

FIG. 2 shows an illustrative schematic of systems and apparatuses that can deliver embodiments of the weighted fluids of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the weighted fluid can be formulated. The weighted fluid can be conveyed via line 12 to wellhead 14, where the weighted fluid enters tubular 16, with tubular 16 extending from wellhead 14 into subterranean formation 18. Upon being ejected from tubular 16, the weighted fluid can subsequently penetrate into subterranean formation 18. Pump 20 can be configured to raise the pressure of the weighted fluid to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the weighted fluid can, in some embodiments, flow back to wellhead 14 and exit subterranean formation 18. The weighted fluid that flows back can be substantially diminished in the concentration of calcium bromide and the one or more secondary salts therein. In some embodiments, the weighted fluid that has flowed back to wellhead 14 can subsequently be recovered, and in some examples reformulated, and recirculated to subterranean formation 18.

It is also to be recognized that the disclosed weighted fluid can also directly or indirectly affect the various downhole or subterranean equipment and tools that can come into contact with the weighted fluid during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Weighted Fluid for Treatment of a Subterranean Formation.

Various embodiments provide a weighted fluid for treatment of a subterranean formation. The weighted fluid can be any suitable weighted fluid that can be used to perform an embodiment of the method for treatment of a subterranean formation described herein. Various embodiments provide a mixture including the weighted fluid, wherein the mixture can be a fluid for treatment of a subterranean formation. The weighted fluid can be a completion fluid (e.g., a weighted fluid for performing a completion operation in the subterranean formation).

For example, the weighted fluid can include calcium bromide, one or more secondary salts that are each independently an inorganic bromide salt other than calcium bromide, and water. The weighted fluid can have a density at standard temperature and pressure of at least about 1.7 $g/cm^3$.

In some embodiments, the weighted fluid can include calcium bromide, manganese bromide, and water. The weighted fluid can have a density at standard temperature and pressure of about 1.7 $g/cm^3$ to about 2.2 $g/cm^3$. The weighted fluid can have a crystallization temperature at standard pressure of about −35° C. to about −7° C. The weighted fluid can have a pH of about 1 to about 4. The weighted fluid can be substantially free of solids having a particle size of greater than about 1 micron. The weighted fluid can be substantially free of elemental zinc and zinc salts.

Method for Preparing a Weighted Fluid for Treatment of a Subterranean Formation.

In various embodiments, the present invention provides a method for preparing a weighted fluid for treatment of a subterranean formation. The method can be any suitable method that produces an embodiment of a weighted fluid described herein. For example, the method can include forming a weighted fluid including calcium bromide, one or more secondary salts that are each independently an inorganic bromide salt other than calcium bromide, and water. The weighted fluid can have a density at standard temperature and pressure of at least about 1.7 $g/cm^3$.

EXAMPLES

Various embodiments of the present invention can be better understood by reference to the following Examples, which are offered by way of illustration. The present invention is not limited to the Examples given herein.

Part I

Example I-1. Formation of Fluids

A brine was formed by combining water, calcium bromide, and manganese bromide. The brine was free of elemental zinc and zinc salts. The brine had a density at standard temperature and pressure of 15.0 ppg (pounds per gallon) (1.8 g/cm$^3$). The brine had a pH of about 3.

A spike brine was formed by combining water, calcium bromide, and manganese bromide, with the calcium bromide and manganese bromide used in the same ratio as used to form the brine, but using higher concentrations of the salts. The spike brine was free of elemental zinc and zinc salts. The spike brine had a density at standard temperature and pressure of 16.0 ppg (pounds per gallon) (1.9 g/cm$^3$). The spike brine had a pH of about 3. The True Crystallization Temperature (TCT) of the 16 ppg spike brine was around 48° F. (8.9° C.).

Example I-2. Density Management

The advantages of the brine of Example I-1 can be exploited at densities between 14.3 ppg (1.7 g/cm$^3$) and 15.5 ppg (1.9 g/cm$^3$). The brine can be cut with water in order to achieve densities less than 15 ppg (1.8 g/cm$^3$). Examples of cut densities, on a mass balance basis, are detailed in Table 1, wherein bbl indicates oil barrel, which is about 159 L.

TABLE 1

Cut density.

| Density (ppg/g/cm$^3$) | Brine (bbl) | Water (bbl) |
|---|---|---|
| 14.3/1.714 | 0.895 | 0.105 |
| 14.4/1.726 | 0.910 | 0.090 |
| 14.5/1.737 | 0.925 | 0.075 |
| 14.6/1.749 | 0.940 | 0.060 |
| 14.7/1.761 | 0.955 | 0.045 |
| 14.8/1.773 | 0.970 | 0.030 |
| 14.9/1.785 | 0.985 | 0.015 |

Examples of spike brine mixtures, on a mass balance basis, are shown in Table 2.

TABLE 2

Spike brine mixtures.

| Density (ppg) | Brine (bbl) | Water (bbl) |
|---|---|---|
| 15.1/1.809 | 0.9 | 0.1 |
| 15.2/1.821 | 0.8 | 0.2 |
| 15.3/1.833 | 0.7 | 0.3 |

TABLE 2-continued

Spike brine mixtures.

| Density (ppg) | Brine (bbl) | Water (bbl) |
|---|---|---|
| 15.4/1.845 | 0.6 | 0.4 |
| 15.5/1.857 | 0.5 | 0.5 |

Example I-3. Crystallization Properties

Crystallization temperatures of the fluids formed in Example I-2 were measured over a range of pressures, where the true crystallization temperature (TCT) is the temperature at which crystalline solids begin to form at standard pressure, and the pressurized crystallization temperature is the temperature at which crystalline solids begin to form at a non-standard pressure. Table 3 gives the TCT temperatures and the PCT temperatures at a variety of pressures for the fluids formed in Example I-2.

TABLE 3

TCT and PCT behavior.

| Density (ppg/g/cm$^3$) | TCT (° F.) | TCT (° C.) | 5,000 psi (34.5 MPa) (° F./° C.) | 10,000 psi (68.9 MPa) (° F./° C.) | 15,000 psi (103.4 MPa) (° F./° C.) | 20,000 psi (137.9 MPa) (° F./° C.) |
|---|---|---|---|---|---|---|
| 14.3/1.714 | −23.8 | −31.0 | −17.8/−27.7 | −10.9/−23.8 | −5.1/−20.6 | 2.0/−16.7 |
| 14.4/1.726 | −19.3 | −28.5 | −13.1/−25.1 | −6.7/−21.5 | −0.6/−18.1 | 6.8/−14.0 |
| 14.5/1.737 | −14.4 | −25.8 | −8.5/−22.5 | −1.4/−18.6 | 4.6/−15.2 | 10.0/−12.2 |
| 14.6/1.749 | −10.8 | −23.8 | −5.9/−21.1 | 1.4/−17.0 | 7.2/−13.8 | 13.5/−10.3 |
| 14.7/1.761 | −7.8 | −22.1 | −1.4/−18.6 | 4.6/−15.2 | 9.6/−12.4 | 15.2/−9.3 |
| 14.8/1.773 | −3.9 | −19.9 | 3.2/−16.0 | 8.5/−13.1 | 13.0/−10.6 | 17.6/−8.0 |
| 14.9/1.785 | −0.8 | −18.2 | 4.8/−15.1 | 10.4/−12.0 | 15.6/−9.1 | 21.1/−6.1 |
| 15.0/1.797 | −17.6 | −27.6 | −10.7/−23.7 | −5.5/−20.8 | 1.1/−17.2 | 8.3/−13.2 |
| 15.1/1.809 | 1.3 | −17.1 | | | | |
| 15.2/1.821 | 1.8 | −16.8 | | | | |
| 15.3/1.833 | 7.8 | −13.4 | | | | |
| 15.4/1.845 | 10.0 | −12.2 | | | | |
| 15.5/1.857 | 18.9 | −7.3 | | | | |

Figure 3:
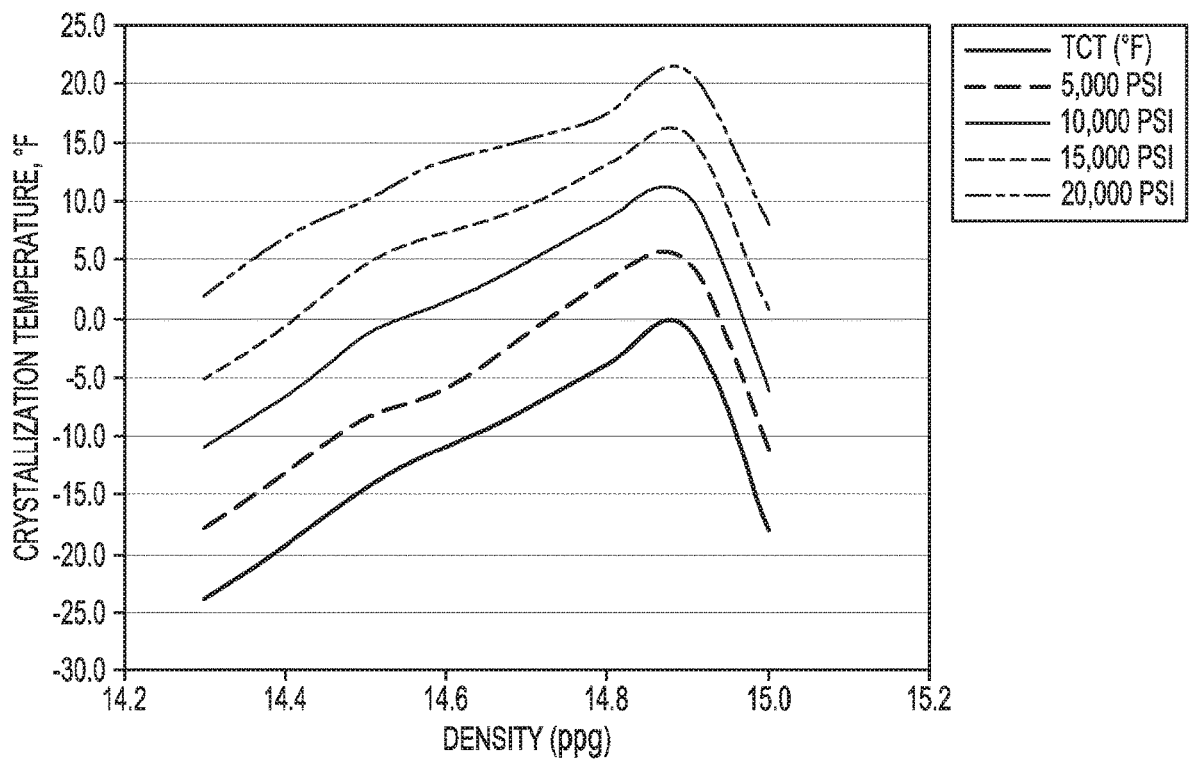
FIG. 3 illustrates the crystallization temperature of various fluids at various pressures, in accordance with various embodiments.
Figure 4:
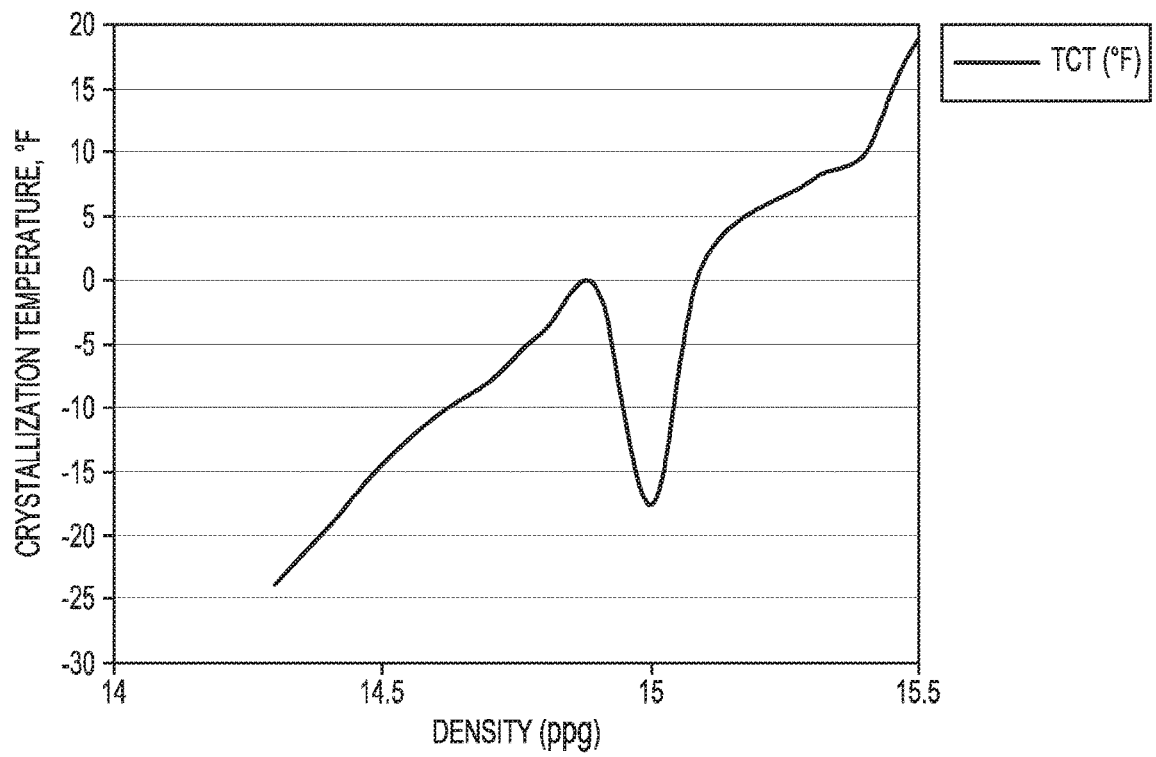
FIG. 4 illustrates the crystallization temperature of various fluids at standard pressure, in accordance with various embodiments.

FIG. 3 illustrates the crystallization temperature of various fluids formed in Example I-2 at various pressures. FIG. 4 illustrates the crystallization temperature of various fluids formed in Example I-2 at standard pressure.

The results show that the fluids formed in Example I-2 maintain low TCT and PCT performance at densities up to 15.5 ppg (1.9 g/cm$^3$). The Eutectic Point occurs around 15 ppg (1.8 g/cm$^3$) with a TCT of −17.6° F. (−27.6° C.) and a PCT at 20,000 psi (137.9 MPa) of 8.3° F. (−13.2° C.).

Example I-4. Corrosion

Despite its low pH and high salinity, corrosion rates in the brine of Example I-1 were remarkably low. The brine of Example I-1 can be in contact with corrosion resistant alloys and even mild steel for extended periods at relatively high temperatures without risk of damage to metal completion components.

Corrosion control can also be achieved with the addition of OXYGON™ oxygen scavenger at a loading of at least 1 ppb (pounds per barrel). General corrosion rates and the effect of OXYGON™ are detailed in Tables 4-5.

TABLE 4

Corrosion properties of brine of Example I-1, given in mm per year (MPY).

| Corrosion protection | Test Days | Mild Steel | | | | SM13CrS-110 Steel | | | |
|---|---|---|---|---|---|---|---|---|---|
| | | 200° F. (93.3° C.) | 250° F. (121.1° C.) | 300° F. (148.9° C.) | 350° F. (176.7° C.) | 200° F. (93.3° C.) | 250° F. (121.1° C.) | 300° F. (148.9° C.) | 350° F. (176.7° C.) |
| None | 7 | 7.12 | 9.55 | 11.92 | 24.32 | 0.12 | 0.07 | 0 | 0.1 |
| | 28 | 2.44 | 2.77 | 2.46 | 10.31 | 0.03 | 0.01 | 0.28 | 0.1 |
| OXYGON ™ | 7 | 2.03 | 1.72 | 2.46 | 2.82 | 0 | 0 | 0 | 0 |
| | 28 | 0.53 | 0.66 | 0.72 | 1.76 | 0 | 0 | 0.02 | 0.03 |

TABLE 5

Corrosion properties of brine of Example I-1, given in mm per year (MPY).

| Corrosion protection | Test Days | 316L SS | | | | VM 25S 125 | | | |
|---|---|---|---|---|---|---|---|---|---|
| | | 200° F. (93.3° C.) | 250° F. (121.1° C.) | 300° F. (148.9° C.) | 350° F. (176.7° C.) | 200° F. (93.3° C.) | 250° F. (121.1° C.) | 300° F. (148.9° C.) | 350° F. (176.7° C.) |
| None | 7 | — | — | — | — | 0.03 | 0.03 | 0.05 | 0.03 |
| | 28 | 0 | 0 | 0 | 0 | 0 | 0 | 0 | 0.02 |
| OXYGON ™ | 7 | — | — | — | — | 0.01 | 0.04 | 0.02 | 0.05 |
| | 28 | 0 | 0 | 0 | 0 | 0 | 0 | 0 | 0.01 |

The tendencies of several corrosion resistant alloys for stress corrosion cracking in the brine of Example I-1 were also studied. One instance of cracking was observed, but most alloys appeared to be resistant to stress corrosion cracking in the brine. The behavior of the same alloys was also studied with the addition of 1 ppb (pounds per barrel) OXYGON™ and no cracking was observed during these exposures. The alloys used in the initial study with no additive are detailed in Table 6.

TABLE 6

Stress corrosion properties in the brine of Example I-1, at 100 psi $N_2$ (0.689 MPa), 190° F. (87.8° C.), 30 days.

| Alloy | Corrosion protection additive | Observation |
|---|---|---|
| SM13CrS-110 | None | Cracking |
| 15Cr-125 | None | No cracking |
| 25CrW-125 | None | No cracking |
| 316SS | None | No cracking |
| SM13CrS-110 | 1 ppb OXYGON ™ | No cracking |
| 15Cr-25 | 1 ppb OXYGON ™ | No cracking |
| 25CrW-125 | 1 ppb OXYGON ™ | No cracking |
| 316SS | 1 ppb OXYGON ™ | No cracking |

Example I-5. Elastomer Compatibility

Elastomer compatibility testing was performed for the brine of Example I-1, by immersing the rubber in the brine at 275° F. (135° C.) for four weeks. Similarly to other high density brines, compatibility with butyl rubber elastomers was poor. However, several fluorinated polymers demonstrated excellent compatibility, as shown in Table 7.

TABLE 7

Elastomer compatibility of the brine of Example I-1.

| Type of rubber | General class or tradename | Compatibility |
|---|---|---|
| Nitrile-butadiene rubber (NBR) | Nipol ® | Poor |
| Hydrogenated nitrile-butadiene rubber (HNBR) | Zetpol ® | Poor |
| Fluoroelastomer (FKM) | Viton ® | Excellent |
| Tetrafluoroethylene/propylene copolymer (FEPM) | Aflas ® | Excellent |
| Perfluoroelastomer (FFKM) | Chemraz ® | Excellent |

Example I-6. Fluid Viscosity

The brine of Example I-1 did not exhibit any significant viscosity increase over that of water. BROMI-VIS® viscosifier was added at a loading of 6 pounds per barrel to produce a fluid having a yield point around 25 lb/100 ft².

Part II

In this Part, the densities of the solutions were determined by the oscillating U-tube technique, which measures the frequency of the oscillation of the liquid sample.

True crystallization temperature determinations in the Examples were determined by one of the two the procedures described here.

Classical procedure. A jacketed glass tube containing 50 mL of sample was mechanically stirred while being cooled using a recirculating bath containing a cooling fluid (for example, glycol). When the sample reached a temperature about 10° C. above the expected first crystal to appear (FCTA) temperature, the sample was cooled at a rate of approximately 0.5° C./min or a smaller temperature increment until the TCT (true crystallization temperature) was observed. The FCTA temperature was recorded at the lowest temperature reached before precipitation, and the TCT was recorded at the highest temperature achieved immediately after precipitation started. The sample was removed from the recirculating bath and warmed; when all of the precipitate had disappeared, the last crystal to dissolve (LCTD) temperature was recorded. Each determination was run with a seed crystal of silica (≥50 μm, ~0.03 g) in the sample.

Instrument procedure. A sample cup containing 0.25 mL of the sample was placed in a Cloud, Pour, and Freeze Point Lab Analyzer (model no. 70Xi; Phase Technology, Richmond, Canada), and the sample was cooled at 0.5 degrees Celsius per minute until freezing was detected by diffusive light-scattering.

(1.70 kg/L). The salts LiBr (4.18 g), SrBr$_2$.6H$_2$O (7.01 g), and BaBr$_2$ (2.21 g) were added to separate CaBr$_2$ solutions. Testing of the strontium-containing and barium-containing samples was discontinued due to solubility and density issues.

Another series of samples was prepared, starting from 40.0 g of an aqueous CaBr$_2$ solution having a density of 12.8 ppg (1.53 kg/L). The salts LiBr (15.18 g), and MgBr$_2$.6H$_2$O were added to separate CaBr$_2$ solutions. Testing of the magnesium-containing sample was discontinued due to solubility and density issues. Results are summarized in Table 8 below.

TABLE 8

| Compar. Ex. | Run | Inorganic bromides | Non-CaBr$_2$ bromide amount[a] | Total bromide amount[a] | Density | TCT[b] |
|---|---|---|---|---|---|---|
| 1 | a | CaBr$_2$ | none | 56.3 wt % | 14.76 ppg (1.769 kg/L) | 35.6° F. (2.0° C.) |
|   | b | CaBr$_2$ | none | 56.0 wt % | 14.68 ppg (1.759 kg/L) | 32.9° F. (0.5° C.) |
|   | c | CaBr$_2$ | none | 55.4 wt % | 14.58 ppg (1.747 kg/L) | 24.8° F. (−4.0° C.) |
| 2 | a | CaBr$_2$ | none | 56.9 wt % | 14.54 ppg (1.742 kg/L) | 22.1° F. (−5.5° C.) |
|   | b | CaBr$_2$, ZnBr$_2$ | 6.0 wt % | 56.0 wt % | 14.57 ppg (1.746 kg/L) | <−5.8° F. (<−21.0° C.) |
| 3 | a | CaBr$_2$ | none | 58.5 wt % | 14.63 ppg (1.753 kg/L) | 26.6° F. (−3.0° C.) |
|   | b | CaBr$_2$, ZnBr$_2$ | 22.9 wt % | 57.5 wt % | 14.67 ppg (1.757 kg/L) | <−5.8° F. (<−21.0° C.) |
| 4 | a | CaBr$_2$, LiBr | 7.7 wt % | 56.8 wt % | 14.55 ppg (1.743 kg/L) | 33.8° F. (1.0° C.) |
|   | b | CaBr$_2$, LiBr | 27.5 wt % | 66.1 wt % | 14.60 ppg (1.749 kg/L) | 39.2° F. (4.0° C.) |

[a]Relative to total weight of solution.
[b]True crystallization temperature; determined by the classical procedure.

Comparative Example II-1

Measurements of the true crystallization temperature (TCT) were made on three samples of calcium bromide aqueous solutions. These samples contained only water and calcium bromide. Results are summarized in Table 8 below.

Comparative Example II-2

Two samples were prepared starting from 50.0 g of an aqueous CaBr$_2$ solution having a density of 14.2 ppg (1.70 kg/L). To one sample more CaBr$_2$ (4.32 g) was added; to the other sample, ZnBr$_2$ (3.19 g) was added. Results are summarized in Table 8 below.

Comparative Example II-3

Two samples were prepared starting from 40.0 g of an aqueous CaBr$_2$ solution having a density of 12.8 ppg (1.53 kg/L). To one sample more CaBr$_2$ (13.18 g) was added; to the other sample, ZnBr$_2$ (11.90 g) was added. Results are summarized in Table 8 below.

Comparative Example II-4

A series of samples was prepared starting from 50.0 g of an aqueous CaBr$_2$ solution having a density of 14.2 ppg Example II-1

A sample was prepared starting from 50.0 g of an aqueous CaBr$_2$ solution having a density of 14.2 ppg (1.70 kg/L). MnBr$_2$ (3.27 g) was added to the CaBr$_2$ solution. Results are summarized in Table 9 below.

Example II-2

A sample was prepared starting from 40.0 g of an aqueous CaBr$_2$ solution having a density of 12.8 ppg (1.53 kg/L). MnBr$_2$ (10.18 g) was added to the CaBr$_2$ solution. Results are summarized in Table 9 below.

Example II-3

Five separate samples were prepared by adding an amount of MnBr$_2$ to aqueous CaBr$_2$ solutions of densities ranging from 13.4 to 14.0 ppg (1.61 to 1.68 kg/L) to obtain aqueous brines with densities of about 14.6 to 15.1 ppg (1.75 to 1.81 kg/L). Some of the samples were filtered to remove haziness. All of the samples were then analyzed to determine their density and true crystallization temperature (TCT). Results are summarized in Table 9 below.

Example II-4

Into a 500 ml flask was placed 160 grams of a CaBr$_2$ solution having a density of 14.2 ppg (1.70 kg/L). The solution was heated to 60° C. and then 30 grams of SnBr$_2$ powder was added with stirring. After stirring for about 1 hour at 60° C., all of the SnBr$_2$ had dissolved, to give a hazy light tan solution. The solution was cooled to ambient temperature and then vacuum filtered through a 1 micron filter medium, to give a clear colorless solution having a density of 16 ppg (1.9 kg/L). To a portion (about 90 g) of this solution, deionized water (9 g) was added to give, after mixing, a solution with a density of 15 ppg (1.8 kg/L). Both samples were stored in a 6 to 7° F. (−14.4 to −13.9° C.) freezer overnight, and after 24 hours remained clear and colorless with no precipitate. Results are summarized in Table 9 below.

Example II-5

Into a 3 L jacketed round-bottom flask equipped with a mechanical stirrer, a thermocouple, and an addition funnel was charged aqueous CaBr$_2$ (14.2 ppg; 673.68 g), deionized water (126.32 g), and MnO powder (99 wt %, 67.92 g). While mixing, this slurry was heated at 67° C. and aqueous HBr (48 wt %; 320.96 g) was added over 1 hour via the addition funnel. After holding at 67° C. for 35 minutes, aqueous HBr (48 wt %; 0.12 g) was added to titrate the pH to 3.18; some solid formation was observed. After cooling to room temperature, the mixture was filtered under vacuum. Water (165.6 g) was removed under weak vacuum at 54° C. to give a clear pink solution (1010 g) with a density of 1.78 g/mL (14.9 ppg) and a pH of 3.03. Results are summarized in Table 9 below.

TABLE 9

| Ex. | Run | Inorganic bromides | Non-CaBr$_2$ bromide amount[a] | Total bromide amount[a] | Density | TCT[b] |
|---|---|---|---|---|---|---|
| 1 | — | CaBr$_2$, MnBr$_2$ | 6.1 wt % | 56.1 wt % | 14.76 ppg (1.769 kg/L) | 10.4° F. (−12.0° C.) |
| 2 | — | CaBr$_2$, MnBr$_2$ | 20.3 wt % | 56.0 wt % | 14.63 ppg (1.753 kg/L) | −13° F. (−25° C.) |
| 3 | a | CaBr$_2$, MnBr$_2$ | 9.3 wt % | 56.5 wt % | 14.89 ppg (1.784 kg/L) | <−7.6° F. (<−22° C.) |
|   | b | CaBr$_2$, MnBr$_2$ | 14.4 wt % | 56.5 wt % | 15.01 ppg (1.799 kg/L) | −9.4° F. (−23.0° C.) |
|   | c | CaBr$_2$, MnBr$_2$ | 13.6 wt % | 55.3 wt % | 15.10 ppg (1.809 kg/L) | 7.7° F. (−13.5° C.) |
|   | d | CaBr$_2$, MnBr$_2$ | 13.6 wt % | 57.6 wt % | 14.67 ppg (1.758 kg/L) | <−13° F. (<−25° C.) |
|   | e | CaBr$_2$, MnBr$_2$ | 20.1 wt % | 57.2 wt % | 14.63 ppg (1.753 kg/L) | <−13° F. (<−25° C.) |
| 4 | a | CaBr$_2$, SnBr$_2$ | 15.8 wt % | 60.6 wt % | 16 ppg (1.9 kg/L) | low[c] |
|   | b | CaBr$_2$, SnBr$_2$ | 6.4 wt % | 47.1 wt % | 15 ppg (1.8 kg/L) | low[c] |
| 5 | — | CaBr$_2$, MnO/HBr | 20.0 wt % | 55.7 wt % | 14.8 ppg (1.78 kg/L) | −14.8° F. (−26° C.) |
| 6 | — | CaBr$_2$, MnO/HBr | 20.1 wt % | 55.6 wt % | 14.9 ppg (1.78 kg/L) | −14.8° F. (−25° C.) |

[a]Relative to total weight of solution.
[b]True crystallization temperature; determined by the classical procedure.
[c]Below the temperature of the freezer (6 to 7° F.; −14.4 to −13.9° C.); no precipitate had formed in the samples after 1 week in the freezer.
[d]Calculated as MnBr$_2$.

was charged aqueous CaBr$_2$ (14.2 ppg; 673.68 g), deionized water (126.32 g), and MnO powder (99 wt %, 67.92 g). While mixing, this slurry was heated at 67° C., and aqueous HBr (48 wt %; 320.96 g) was added over 1 hour via the addition funnel. After holding at 67° C. for 40 minutes, aqueous NaOH (50 wt %) or aqueous HBr (48 wt %) was used to titrate the pH to 4.89; some solid formation was observed. The total amount of HBr and/or NaOH solution added was less than 10 g. After cooling to room temperature, the mixture was filtered under vacuum, more aqueous HBr (48 wt %) was added to adjust the pH to 3.0 to 3.5. A total of 2.04 g of NaOH solution was added; less than 5 g of aqueous HBr were added. Water (159 g) was removed under weak vacuum at 54° C. to give a clear pink solution (1004 g) with a density of 1.78 g/mL (14.8 ppg) and a pH of 3.4. Results are summarized in Table 9 below.

Example II-6

Into a 3 L jacketed round-bottom flask equipped with a mechanical stirrer, a thermocouple, and an addition funnel Example II-7

Several CaBr$_2$/MnBr$_2$ aqueous brine samples with different pH values were prepared starting from a CaBrd$_2$/MnBr$_2$ aqueous brine prepared as in Example II-5. The pH value of each sample was adjusted by adding aqueous HBr (48 wt %) and/or aqueous NaOH (50%) until the desired pH value was reached. In each sample, the total amount of HBr and/or NaOH solution added was less than 5 g. Some of the samples to which NaOH was added formed a small amount of precipitate; these samples were filtered. These samples with different pH values were placed in a 60° C. oven to heat-age for one week. The turbidity and presence or absence of a precipitate were observed visually and recorded at the end of the week. Results are summarized in Table 10 below.

Example II-8

Several CaBr$_2$/MnBr$_2$ aqueous brine samples with different pH values were prepared starting from a CaBr$_2$/MnBr$_2$ aqueous brine prepared as in Example II-5. The pH value of each sample was adjusted by adding aqueous HBr (48 wt %)

and/or aqueous NaOH (50%) until the desired pH value was reached. In each sample, the total amount of HBr and/or NaOH solution added was less than 10 g. Some of the samples to which NaOH was added formed a small amount of precipitate; these samples were filtered. To some of the samples, enough glycerol was added to make a solution containing either 5 wt % or 10 wt % glycerol. These samples were placed in a 60° C. oven to heat-age for one week. The turbidity and presence or absence of a precipitate were observed visually and recorded at the end of the week. Results are summarized in Table 10 below.

Example II-9

Example II-8 was repeated, except that the samples were allowed to sit at ambient temperature rather than oven-aging. Results are summarized in Table 10 below.

Example II-10

Several $CaBr_2/MnBr_2$ aqueous brine samples having a pH of about 3.5 or less as in Example II-5 were used. To these samples, enough glycerol was added to make a solution containing either 5 wt % or 10 wt % glycerol. All of these solutions remained clear; no precipitate was observed in any of the solutions over time at room temperature.

TABLE 10

| Ex. | Inorganic bromides | Glycerol amt.[a] | pH | Turbidity | Precip. | Aging temp. |
|---|---|---|---|---|---|---|
| 7 | $CaBr_2$, $MnBr_2$ | 0 | 1.00 | clear | none | 60° C. |
|  |  |  | 1.99 | clear | none |  |
|  |  |  | 3.00 | clear | none |  |
|  |  |  | 3.16 | clear | none |  |
|  |  |  | 3.30 | clear | none |  |
|  |  |  | 3.40 | clear | none |  |
|  |  |  | 3.62 | cloudy | none |  |
|  |  |  | 3.99 | cloudy | yes |  |
|  |  |  | 4.28 | cloudy | yes |  |
| 8 | $CaBr_2$, $MnBr_2$ | 0 | 4.58 | cloudy | yes | 60° C. |
|  |  | 5% | 4.58 | cloudy | none |  |
|  |  | 0 | 4.28 | cloudy | yes |  |
|  |  | 5% | 4.28 | clear | none |  |
|  |  | 10% | 4.28 | clear | none |  |
| 9 | $CaBr_2$, $MnBr_2$ | 0 | 4.58 | cloudy | yes | ambient |
|  |  | 5% | 4.58 | clear | none |  |
|  |  | 0 | 4.28 | cloudy | yes |  |

TABLE 10-continued

| Ex. | Inorganic bromides | Glycerol amt.[a] | pH | Turbidity | Precip. | Aging temp. |
|---|---|---|---|---|---|---|
|  |  | 5% | 4.28 | clear | none |  |
|  |  | 10% | 4.28 | clear | none |  |

[a]relative to total weight of solution

Example II-11

A sample was prepared starting from 100.0 g of an aqueous $CaBr_2/MnBr_2$ (1.75:1 (wt:wt) $CaBr_2$:$MnBr_2$) clear brine fluid having a density of 15.0 ppg (1.80 kg/L). $SnBr_2$ (7.00 g) was mixed with the $CaBr_2/MnBr_2$ clear brine fluid at 48° C. After the solids had dissolved, the mixture was cooled to room temperature and then vacuum filtered through a 2 micron glass filter, to give a clear liquid having a density of 15.8 ppg (1.89 kg/L). Some of the water was removed under vacuum at 54° C. to give a clear brine fluid with a density of 16.0 ppg (1.92 kg/L). A sample of this clear brine fluid was analyzed to determine its true crystallization temperature (TCT), which was below −23° C. Results are summarized in Table 11 below.

In Examples II-12, II-13, II-14, II-15 and II-16, the densities were measured with calibrated graduated cylinders. In this method, a 50 mL graduated cylinder was calibrated using 30.000 g of deionized water. The volume (29.7 mL) was recorded to calibrate the scale on the graduated cylinder. Each well fluid sample (29.7 mL) was weighed, and the density was calculated by using the following formula: density (g/mL)=mass (g)/29.7 mL. For smaller sample sizes, a 10 mL graduated cylinder was calibrated and used in the same manner to determine the densities.

Example II-12

Several samples were prepared by mixing an amount of either $SnBr_4$ (4.00 g; 9.00 g) or $BiBr_3$ (4.00 g; 6.00 g) with 27.00 g of an aqueous $CaBr_2/MnBr_2$ (1.75:1 (wt:wt) $CaBr_2$:$MnBr_2$) clear brine fluid having a density of 14.8 ppg (1.77 kg/L). All of the samples were then analyzed to determine their density. Each sample was filtered through a 1 micron syringe filter, and a portion of each sample was placed in a freezer at −16° C., and another portion of each sample was placed in an oven at 60° C. All of the samples in both the oven and the freezer remained clear after 3 days or longer. Results are summarized in Table 11 below.

TABLE 11

| Ex. | Run | Inorganic bromides | Non-$CaBr_2$ bromide amount[a] | $MnBr_2$ amount[a] | Total bromide amount | Density | Soln. remained clear at −16° C. |
|---|---|---|---|---|---|---|---|
| 10 | — | $CaBr_2$, $MnBr_2$, $SnBr_2$ | 26.3 wt % | 19.6 wt % | 60.6 wt % | 16.0 ppg (1.92 kg/L) | at least one week |
| 11 | a | $CaBr_2$, $MnBr_2$, $SnBr_4$ | 30.6 wt % | 17.7 wt % | 61.5 wt % | 16.1 ppg (1.93 kg/L) | at least one week[b] |
|  | b | $CaBr_2$, $MnBr_2$, $SnBr_4$ | 40.3 wt % | 15.3 wt % | 66.9 wt % | 17.5 ppg (2.10 kg/L) | at least 3 days[c] |
|  | c | $CaBr_2$, $MnBr_2$, $SnBr_4$ | 34.9 wt % | 16.7 wt % | 64.0 wt % | 16.7 ppg (2.00 kg/L) | at least one day |
|  | d | $CaBr_2$, $MnBr_2$, $BiBr_3$ | 30.6 wt % | 17.7 wt % | 61.5 wt % | 16.3 ppg (1.95 kg/L) | at least one week |

TABLE 11-continued

| Ex. | Run | Inorganic bromides | Non-CaBr$_2$ bromide amount[a] | MnBr$_2$ amount[a] | Total bromide amount | Density | Soln. remained clear at −16° C. |
|---|---|---|---|---|---|---|---|
| | e | CaBr$_2$, MnBr$_2$, BiBr$_3$ | 41.0 wt % | 20.7 wt % | 61.5 wt % | 16.5 ppg (1.98 kg/L) | at least one week |

[a]Relative to total weight of solution.
[b]True crystallization temperature −34.95° C.; determined by the instrument procedure.
[c]True crystallization temperature below −32° C.; determined by the instrument procedure.

Example II-13

Two samples were prepared by mixing an amount of SnBr$_2$ (1.30 g; 4.00 g) with 27.00 g of an aqueous CaBr$_2$/MnBr$_2$ (1.75:1 (wt:wt) CaBr$_2$:MnBr$_2$) clear brine fluid having a density of 15.3 ppg (1.83 kgL). Both of the samples were then analyzed to determine their density. Each sample was filtered through a 1 micron syringe filter, then enough formic acid to make a concentration of 2000 ppm in the solution was added. Then a portion of each sample was placed in a freezer at −16° C., and another portion of each sample was placed in an oven at 60° C. The samples in both the oven and the freezer remained clear after one week. Results are summarized in Table 12 below.

Example II-14

Two separate samples were prepared by mixing either SnBr$_2$ (6.00 g) or BiBr$_3$ (6.00 g) with an aqueous CaBr$_2$ solution containing formic acid (2000 ppm) and having a density of 14.2 ppg (1.70 kg/L). Both of the samples were then analyzed to determine their density. Each sample was filtered through a 1 micron syringe filter, then enough formic acid to make a concentration of 2000 ppm in the solution was added. Then a portion of each sample was placed in a freezer at −16° C. and another portion of each sample was placed in an oven at 60° C. The samples in both the oven and the freezer remained clear overnight or longer. Results are summarized in Table 12 below.

TABLE 12

| Ex. | Run | Inorganic bromides | Non-CaBr$_2$ bromide amount | MnBr$_2$ amount[a] | Total bromide amount[a] | Density | Soln. remained clear at −16° C. |
|---|---|---|---|---|---|---|---|
| 13 | a | CaBr$_2$, MnBr$_2$, SnBr$_2$ | 24.0 wt % | 19.4 wt % | 57.9 wt % | 15.9 ppg (1.90 kg/L) | at least one week |
| | b | CaBr$_2$, MnBr$_2$, SnBr$_2$ | 30.6 wt % | 17.7 wt % | 61.5 wt % | 16.3 ppg (1.95 kg/L) | at least one week |
| 14 | a | CaBr$_2$, SnBr$_2$ | 18.2 wt % | none | 61.7 wt % | 16.2 ppg (1.94 kg/L) | at least overnight |
| | b | CaBr$_2$, BiBr$_3$ | 18.2 wt % | none | 61.7 wt % | 16.6 ppg (1.99 kg/L) | at least 2 days |

[a]relative to total weight of solution.

Example II-15

Several samples were prepared by mixing an amount of one or more inorganic bromide salts, and in some instances deionized water and formic acid, with an amount of an aqueous calcium bromide solution having a density of 14.2 ppg (1.70 kg/L; WellBrom®, Albemarle Corporation). Each mixture was heated to dissolve the solids. Details for each solution are as follows:

formic acid (80.0 mg) and InBr$_3$ (6.00 g); deionized water (0.50 g) had been added to 27.00 g of the calcium bromide solution; heating was at 50° C.;

InBr$_3$ (6.90 g) and 27.00 g of the calcium bromide solution; heating was at 48 to 50° C.;

an aqueous solution of MnBr$_2$ (14.10 g; 50.3 wt %) and InBr$_3$ (6.96 g); 13.15 g of the calcium bromide solution; heating was at 48 to 50° C.; and formic acid (80.0 mg) and SnBr$_4$ with 27.00 g of the calcium bromide solution, to which deionized water (0.73 g) had been added; heating was at 49° C.

After the solids had dissolved, the mixture was cooled to room temperature. After cooling to room temperature, each solution was analyzed to determine its density. A sample from each solution was placed in a freezer at −16° C., and another sample from each solution was placed in an oven at 60° C. Results are summarized in Table 13 below.

Example II-16

A sample was prepared by mixing SnBr$_4$ (10.17 g) and deionized water (4.11 g) containing HBr (0.02 g; 48%). The mixture was heated at 35° C. to dissolve the solids. After the solids had dissolved, the mixture was cooled to room temperature, yielding a clear liquid having a density of 18.8 ppg (2.25 kg/L). A sample from the solution was placed in a freezer at −16° C., and another sample from the solution was placed in an oven at 60° C. The samples in both the oven and the freezer remained clear after 72 hours. Results are summarized in Table 13 below.

Example II-17

A sample was prepared by mixing InBr$_3$ and deionized water in amounts to form a clear solution having a density of 16.0 ppg (1.92 kg/L), a sample of which was placed in a freezer at −16° C. Results are summarized in Table 13 below.

TABLE 13

| Ex. | Run | Inorganic bromide(s) | Non-CaBr$_2$ bromide amount[a] | Total bromide amount[a] | Formic acid[a] | Density | Soln. remained clear at −16° C. |
|---|---|---|---|---|---|---|---|
| 15 | a | CaBr$_2$, InBr$_3$ | 17.9 wt % | 60.8 wt % | 2280 ppm | 16.0 ppg (1.92 kg/L) | at least 6 days |
|  | b | CaBr$_2$, MnBr$_3$ | 36.6 wt % | 64.9 wt % | none | 17.2 ppg (2.06 kg/L) | at least 72 hrs.[b] |
|  | c | CaBr$_2$, MnBr$_2$, InBr$_3$ | 41.0 wt % | 61.5 wt % | none | 16.6 ppg (1.99 kg/L) | at least 96 hrs. |
|  | d | CaBr$_2$, SnBr$_4$ | 24.5 wt % | 63.7 wt % | 2700 ppm | 16.5 ppg (1.98 kg/L) | at least 6 hrs. |
| 16 | — | SnBr$_4$ | 71.1 wt % | 71.1 wt % | none | 18.8 ppg (2.25 kg/L) | at least 72 hrs. |
| 17 | — | InBr$_3$ | 60 wt % | 60 wt % | none | 16.0 ppg (1.92 kg/L) | at least 24 hrs. |

[a]Relative to total weight of solution.
[b]True crystallization temperature below −32° C.; determined by the instrument procedure.

Example II-18

Several samples were prepared by dissolving an amount of Mn(NO$_3$)$_2$.H$_2$O in deionized water at ambient temperature, adding CaBr$_2$ to the solution, and in some instances also adding HNO$_3$ or HCl. Each mixture was heated to dissolve the solids. Details for each solution are as follows:

a) Mn(NO$_3$)$_2$.H$_2$O (24.4 g) and deionized water (10.70 g), CaBr$_2$ (20.45 g) added at 56° C.;
b) Mn(NO$_3$)$_2$.H$_2$O (12.20 g) and deionized water (5.35 g), CaBr$_2$ (10.23 g), HNO$_3$ (conc., 65 mg) was then added;
c) Mn(NO$_3$)$_2$.H$_2$O (12.20 g) and deionized water (2.09 g), CaBr$_2$ (5.02 g);
d) Mn(NO$_3$)$_2$.H$_2$O (12.20 g) and deionized water (5.35 g), then added HCl (conc.; 58 mg), then CaBr$_2$ (10.23 g).

After the solids had dissolved, each mixture was cooled to room temperature. The cooled solutions were clear. After cooling to room temperature, each sample was filtered through a 1 micron syringe filter and analyzed to determine its density. A portion of each sample was placed in a freezer at −16° C. All of the samples in the freezer remained crystal-free for at least one week. Results are summarized in Table 14 below.

Example II-19

A sample was prepared by adding Mn(NO$_3$)$_2$.H$_2$O (3.00 g) to an aqueous CaBr$_2$ solution (57.6 wt %, 25.05 g). The mixture was heated to 50° C. and then cooled to room temperature to give a clear, light pink solution with a density of 15.3 ppg (1.83 kg/L). After filtration through a 1-micron syringe filter, a portion of the sample was placed in a freezer at −16° C., and another portion of the sample was placed in an oven at 60° C. Both samples remain clear after 24 hours. Results are summarized in Table 14 below.

TABLE 14

| Ex. | Run | Inorganic bromide | Total bromide amount[a] | Total Mn(NO$_3$)$_2$ amount[a] | Acid | Density | Soln. remained clear at −16° C. |
|---|---|---|---|---|---|---|---|
| 18 | a | CaBr$_2$ | 36.7 wt % | 43.9 wt % | — | 14.9 ppg (1.79 kg/L) | at least one week |
| 18 | b | CaBr$_2$ | 36.7 wt % | 43.8 wt % | HNO$_3$ | 14.9 ppg (1.79 kg/L) | at least one week |
| 18 | c | CaBr$_2$ | 26.0 wt % | 57.2 wt % | — | 15.1 ppg (1.81 kg/L) | at least one week |
| 18 | d | CaBr$_2$ | 36.7 wt % | 39.7 wt % | HCl | 15.0 ppg (1.80 kg/L) | at least one week |
| 19 | — | CaBr$_2$ | 51.4 wt % | 10.7 wt % | — | 15.3 ppg (1.83 kg/L) | at least 24 hrs. |

[a]Relative to total weight of solution.

Example II-20

Several samples were prepared by diluting an aqueous solution of either CaBr$_2$ or MnBr$_2$ with deionized water and adding an amount of sodium metatungstate to the diluted solution at ambient temperature. Each mixture was then heated. Details for each solution are as follows:

a) CaBr$_2$ (aq., 53.2 wt %, 15.05 g), deionized water (2.81 g), sodium metatungstate hydrate (4.50 g); heating was at 54-56° C.;
b) MnBr$_2$ (aq., 50 wt %, 15.00 g), deionized water (2.00 g), sodium metatungstate hydrate (3.29 g); heating was at 35° C.;
c) MnBr$_2$ (aq., 50 wt %, 15.00 g), deionized water (2.00 g), sodium metatungstate hydrate (6.00 g); heating was at 50 to 58° C.

After the solids had dissolved, each mixture was cooled to room temperature. After cooling to room temperature, each sample was filtered through a 1 micron syringe filter, and clear, colorless solutions were obtained. Each sample was then analyzed to determine its density. A portion of each sample was placed in a freezer at −16° C. All of the samples in the freezer remained clear at least overnight. Results are summarized in Table 15 below.

Example II-21

Two samples were prepared by mixing an amount of lithium bromide with a metatungstate salt. Details for each solution are as follows:

A) LiBr (8.00 g) was dissolved in deionized water (12.04 g). Into this solution was added sodium metatungstate hydrate (8.33 g), to give a colorless solution with a density of 15.0 ppg (1.80 kg/L); and B) LiBr (10.00 g) was dissolved in deionized water (10.00 g). Into this solution was added an aqueous lithium metatungstate solution (p=2.95 g/mL) to give a colorless solution with density of 16.3 ppg (1.95 kg/L).

Each solution was filtered through a 1-micron syringe filter, after which a portion of each sample was placed in a freezer at −16° C., and another portion of each sample was placed in an oven at 60° C. Both the freezer and oven samples from run A remained clear after one week. Both the freezer and oven samples from run B remained clear after at least 20 hours. Results are summarized in Table 15 below.

TABLE 15

| Ex. | Run | Inorganic bromide | Total bromide amount[a] | Total metatungstate salt amount[a] | Density | TCT[b] |
|---|---|---|---|---|---|---|
| 20 | a | CaBr$_2$ | 35.8 wt % | 20.0 wt % | 14.9 ppg (1.79 kg/L) | −27.8° C. |
| 20 | b | MnBr$_2$ | 37.0 wt % | 18.8 wt % | 15.3 ppg (1.83 kg/L) | — |
| 20 | c | MnBr$_2$ | 32.6 wt % | 25.9 wt % | 16.4 ppg (1.97 kg/L) | −31.01° C. |
| 21 | a | LiBr | 28.2 wt % | 29.4 wt % | 15.0 ppg (1.80 kg/L) | −29.8° C. |
| 21 | b | LiBr | — | — | 16.3 ppg (1.95 kg/L) | —[d] |

[a]Relative to total weight of solution.
[b]True crystallization temperature; determined by the instrument procedure.
[c]Solution remained clear at −16° C. overnight.
[d]Solution remained clear at −16° C. for at least 20 hours.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of treating a subterranean formation, the method comprising:
placing in the subterranean formation a weighted fluid comprising
calcium bromide;
one or more secondary salts that are each independently an inorganic bromide salt other than calcium bromide; and
water;
wherein the weighted fluid has a density at standard temperature and pressure of at least about 1.7 g/cm$^3$.

Embodiment 2 provides the method of Embodiment 1, wherein the weighted fluid is substantially free of elemental zinc and zinc salts.

Embodiment 3 provides the method of Embodiment 2, wherein about 0 wt % to about 10 wt % of the weighted fluid is elemental zinc, zinc salts, or a combination thereof.

Embodiment 4 provides the method of any one of Embodiments 2-3, wherein about 0 wt % to about 2 wt % of the weighted fluid is elemental zinc, zinc salts, or a combination thereof.

Embodiment 5 provides the method of any one of Embodiments 2-4, wherein 0 wt % of the weighted fluid is elemental zinc and zinc salts.

Embodiment 6 provides the method of any one of Embodiments 1-5, wherein the method further comprises obtaining or providing the weighted fluid, wherein the obtaining or providing of the weighted fluid occurs above-surface.

Embodiment 7 provides the method of any one of Embodiments 1-6, wherein the method further comprises obtaining or providing the weighted fluid, wherein the obtaining or providing of the weighted fluid occurs in the subterranean formation.

Embodiment 8 provides the method of any one of Embodiments 1-7, wherein the weighted fluid is a completion fluid, a workover fluid, a drilling fluid, a perforating fluid, a displacement fluid, a well suspension fluid, a packer fluid, or a combination thereof.

Embodiment 9 provides the method of any one of Embodiments 1-8, further comprising performing a subterranean operation using the weighted fluid as a completion fluid, a workover fluid, a drilling fluid, a perforating fluid, a displacement fluid, a well suspension fluid, a packer fluid, or a combination thereof.

Embodiment 10 provides the method of any one of Embodiments 1-9, further comprising performing a completion operation in the subterranean formation using the weighted fluid as a completion fluid.

Embodiment 11 provides the method of any one of Embodiments 1-10, wherein the method comprises using the weighted fluid to perform in the subterranean formation a completion operation, a workover operation, a drilling operation, a perforating operation, a displacement operation, a gravel packing operation, a well suspension operation, a packing operation, or a combination thereof.

Embodiment 12 provides the method of any one of Embodiments 1-11, wherein the method comprises performing a completion operation in the subterranean formation with the weighted fluid.

Embodiment 13 provides the method of any one of Embodiments 1-12, wherein the water is about 0.001 wt % to about 99.999 wt % of the weighted fluid.

Embodiment 14 provides the method of any one of Embodiments 1-13, wherein the water is about 10 wt % to about 90 wt % of the weighted fluid.

Embodiment 15 provides the method of any one of Embodiments 1-14, wherein the water is fresh water, brine, produced water, flowback water, brackish water, and sea water.

Embodiment 16 provides the method of any one of Embodiments 1-15, wherein the weighted fluid is substantially free of solids.

Embodiment 17 provides the method of any one of Embodiments 1-16, wherein about 0 wt % to about 10 wt % of the weighted fluid is solids.

Embodiment 18 provides the method of Embodiment 17, wherein the solids have a particle size of equal to or greater than about 1 nm.

Embodiment 19 provides the method of any one of Embodiments 17-18, wherein the solids have a particle size of equal to or greater than about 1 micron.

Embodiment 20 provides the method of any one of Embodiments 17-19, wherein the solids have a particle size of equal to or greater than 1 mm.

Embodiment 21 provides the method of any one of Embodiments 1-20, wherein about 0 wt % to about 2 wt % of the weighted fluid is solids.

Embodiment 22 provides the method of any one of Embodiments 1-21, wherein 0 wt % of the weighted fluid is solids.

Embodiment 23 provides the method of any one of Embodiments 1-22, wherein the weighted fluid has a density at standard temperature and pressure of about 1.7 $g/cm^3$ to about 2.2 $g/cm^3$.

Embodiment 24 provides the method of any one of Embodiments 1-23, wherein the weighted fluid has a density at standard temperature and pressure of about 1.75 $g/cm^3$ to about 2.10 $g/cm^3$.

Embodiment 25 provides the method of any one of Embodiments 1-24, wherein the weighted fluid has a crystallization temperature at standard pressure of less than about −6.7° C.

Embodiment 26 provides the method of any one of Embodiments 1-25, wherein the weighted fluid has a crystallization temperature at standard pressure of about −35° C. to about −7° C.

Embodiment 27 provides the method of any one of Embodiments 1-26, wherein the weighted fluid has a crystallization temperature at about 34.5 MPa to about 137.9 MPa of about −35° C. to about −7° C.

Embodiment 28 provides the method of any one of Embodiments 1-27, wherein the weighted fluid has a crystallization temperature at about 34.5 MPa to about 137.9 MPa of about −6.1° C. to about −27.7° C.

Embodiment 29 provides the method of any one of Embodiments 1-28, wherein the weighted fluid has a density at standard temperature and pressure of about 1.8 $g/cm^3$.

Embodiment 30 provides the method of Embodiment 29, wherein the weighted fluid has a crystallization temperature at standard pressure of about −27.6° C.

Embodiment 31 provides the method of any one of Embodiments 29-30, wherein the weighted fluid has a crystallization temperature at about 34.5 MPa to about 137.9 MPa of about −13.2° C. to about −23.7° C.

Embodiment 32 provides the method of any one of Embodiments 1-31, wherein the weighted fluid has a pH of about 1 to about 7.

Embodiment 33 provides the method of any one of Embodiments 1-32, wherein the weighted fluid has a pH of about 2 to about 4.

Embodiment 34 provides the method of any one of Embodiments 1-33, wherein the calcium bromide is about 0.1 wt % to about 99.9 wt % of the weighted fluid.

Embodiment 35 provides the method of any one of Embodiments 1-34, wherein the calcium bromide is about 20 wt % to about 50 wt % of the weighted fluid.

Embodiment 36 provides the method of any one of Embodiments 1-35, wherein the one or more secondary salts are about 0.1 wt % to about 99.9 wt % of the weighted fluid.

Embodiment 37 provides the method of any one of Embodiments 1-36, wherein the one or more secondary salts are about 5 wt % to about 45 wt % of the weighted fluid.

Embodiment 38 provides the method of any one of Embodiments 1-37, wherein the one or more secondary salts are independently selected from the group consisting of manganese bromide, tin(II) bromide, tin(IV) bromide, bismuth bromide, and indium bromide.

Embodiment 39 provides the method of any one of Embodiments 1-38, wherein the one or more secondary salts are only manganese bromide.

Embodiment 40 provides the method of any one of Embodiments 1-39, wherein the one or more secondary salts are free of materials other than manganese bromide.

Embodiment 41 provides the method of any one of Embodiments 1-40, wherein the one or more secondary salts are at least one of manganese bromide, tin(II) bromide, tin(IV) bromide, and indium bromide.

Embodiment 42 provides the method of any one of Embodiments 1-41, wherein the weighted fluid has a mass ratio of the calcium bromide to the one or more secondary salts of about 1000:1 to about 1:1000.

Embodiment 43 provides the method of any one of Embodiments 1-42, wherein the weighted fluid has a mass ratio of the calcium bromide to the one or more secondary salts of about 10:1 to about 0.4:1.

Embodiment 44 provides the method of any one of Embodiments 1-43, wherein the weighted fluid is substantially free of materials other than the calcium bromide, the one or more secondary salts, an optional acid, and the water.

Embodiment 45 provides the method of any one of Embodiments 1-44, wherein the one or more secondary salts are at least one of manganese bromide, tin(II) bromide, tin(IV) bromide, and indium bromide, wherein the weighted fluid is substantially free of materials other than the calcium bromide, the manganese bromide, tin(II) bromide, tin(IV) bromide, and indium bromide, an optional acid, and the water.

Embodiment 46 provides the method of any one of Embodiments 1-45, wherein the weighted fluid further comprises a secondary weighting agent.

Embodiment 47 provides the method of any one of Embodiments 1-46, wherein the secondary weighting agent is zinc bromide.

Embodiment 48 provides the method of any one of Embodiments 1-47, wherein the weighted fluid further comprises an acid.

Embodiment 49 provides the method of Embodiment 48, wherein the acid is formic acid, hydrobromic acid, or a combination thereof.

Embodiment 50 provides the method of any one of Embodiments 1-49, wherein the weighted fluid further comprises an inorganic oxide or hydroxide.

Embodiment 51 provides the method of any one of Embodiments 1-50, wherein the weighted fluid further comprises manganese(II) nitrate.

Embodiment 52 provides the method of any one of Embodiments 1-51, wherein the weighted fluid further comprises one or more water-soluble polytungstate salts.

Embodiment 53 provides the method of any one of Embodiments 1-52, wherein the weighted fluid further comprises glycerol.

Embodiment 54 provides the method of any one of Embodiments 1-53, wherein the weighted fluid further comprises a corrosion inhibitor.

Embodiment 55 provides the method of any one of Embodiments 1-54, wherein the weighted fluid further comprises an oxygen scavenger.

Embodiment 56 provides the method of any one of Embodiments 1-55, wherein the weighted fluid further comprises a sulfide scavenger.

Embodiment 57 provides the method of any one of Embodiments 1-56, wherein the weighted fluid further comprises a biocide.

Embodiment 58 provides the method of any one of Embodiments 1-57, wherein the weighted fluid further comprises a viscosifier.

Embodiment 59 provides the method of any one of Embodiments 1-58, wherein the viscosifier is a cellulose derivative.

Embodiment 60 provides the method of any one of Embodiments 1-59, wherein the weighted fluid further comprises a lubricant.

Embodiment 61 provides the method of any one of Embodiments 1-60, wherein the weighted fluid further comprises bridging solids.

Embodiment 62 provides the method of any one of Embodiments 1-61, further comprising combining the weighted fluid with an aqueous or oil-based fluid comprising a drilling fluid, stimulation fluid, fracturing fluid, spotting fluid, clean-up fluid, completion fluid, workover fluid, perforating fluid, displacement fluid, well suspension fluid, remedial treatment fluid, abandonment fluid, pill, acidizing fluid, cementing fluid, packer fluid, logging fluid, or a combination thereof, to form a mixture, wherein the placing the weighted fluid in the subterranean formation comprises placing the mixture in the subterranean formation.

Embodiment 63 provides the method of any one of Embodiments 1-62, wherein at least one of prior to, during, and after the placing of the weighted fluid in the subterranean formation, the weighted fluid is used in the subterranean formation, at least one of alone and in combination with other materials, as a drilling fluid, stimulation fluid, fracturing fluid, spotting fluid, clean-up fluid, completion fluid, workover fluid, perforating fluid, displacement fluid, well suspension fluid, remedial treatment fluid, abandonment fluid, pill, acidizing fluid, cementing fluid, packer fluid, logging fluid, or a combination thereof.

Embodiment 64 provides the method of any one of Embodiments 1-63, wherein the weighted fluid further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 65 provides the method of any one of Embodiments 1-64, wherein the placing of the weighted fluid in the subterranean formation comprises fracturing at least part of the subterranean formation to form at least one subterranean fracture.

Embodiment 66 provides the method of any one of Embodiments 1-65, wherein the weighted fluid further comprises a proppant, a resin-coated proppant, or a combination thereof.

Embodiment 67 provides the method of any one of Embodiments 1-66, wherein the placing of the weighted fluid in the subterranean formation comprises pumping the weighted fluid through a tubular disposed in a wellbore and into the subterranean formation.

Embodiment 68 provides the method of any one of Embodiments 1-67, wherein the placing of the weighted fluid in the subterranean formation comprises pumping the weighted fluid through a drill string disposed in a wellbore, through a drill bit at a downhole end of the drill string, and back above-surface through an annulus.

Embodiment 69 provides the method of Embodiment 68, further comprising processing the weighted fluid exiting the annulus with at least one fluid processing unit to generate a cleaned weighted fluid and recirculating the cleaned weighted fluid through the wellbore.

Embodiment 70 provides a system for performing the method of any one of Embodiments 1-69, the system comprising:
    a tubular disposed in the subterranean formation; and
    a pump configured to pump the weighted fluid in the subterranean formation through the tubular.

Embodiment 71 provides a system for performing the method of any one of Embodiments 1-69, the system comprising:
    a drill string disposed in a wellbore, the drill string comprising a drill bit at a downhole end of the drill string;
    an annulus between the drill string and the wellbore; and
    a pump configured to circulate the weighted fluid through the drill string, through the drill bit, and back above-surface through the annulus.

Embodiment 72 provides a method of treating a subterranean formation, the method comprising:
    placing in the subterranean formation a weighted fluid comprising
    calcium bromide;
    manganese bromide; and
    water;
    wherein,
        the weighted fluid has a density at standard temperature and pressure of about 1.7 g/cm$^3$ to about 2.2 g/cm$^3$,
        the weighted fluid has a crystallization temperature at standard pressure of about −35° C. to about −7° C.,
        the weighted fluid has a pH of about 1 to about 4,
        the weighted fluid is substantially free of solids having a particle size of greater than about 1 micron, and
        the weighted fluid is substantially free of elemental zinc and zinc salts.

Embodiment 73 provides a system comprising:
    a tubular disposed in a subterranean formation; and
    a pump configured to pump a weighted fluid in the subterranean formation through the tubular, wherein the weighted fluid comprises
    calcium bromide;
    one or more secondary salts that are each independently an inorganic bromide salt other than calcium bromide; and
    water;
    wherein the weighted fluid has a density at standard temperature and pressure of at least about 1.7 g/cm.

Embodiment 74 provides the system of Embodiment 73, wherein the tubular comprises a drill string disposed in a wellbore, the drill string comprising a drill bit at a downhole end of the drill string;

the system further comprises an annulus between the drill string and the wellbore; and the pump is configured to circulate the weighted fluid through the drill string, through the drill bit, and back above-surface through the annulus.

Embodiment 75 provides the system of Embodiment 74, further comprising a fluid processing unit configured to process the weighted fluid exiting the annulus to generate a cleaned drilling fluid for recirculation through the wellbore.

Embodiment 76 provides a weighted fluid for treatment of a subterranean formation, the weighted fluid comprising:
calcium bromide;
one or more secondary salts that are each independently an inorganic bromide salt other than calcium bromide; and
water;
wherein the weighted fluid has a density at standard temperature and pressure of at least about 1.7 g/cm$^3$.

Embodiment 77 provides a mixture comprising the weighted fluid of Embodiment 76.

Embodiment 78 provides the weighted fluid or mixture of any one of Embodiments 76-77, wherein the weighted fluid or mixture is for performing a completion operation in the subterranean formation.

Embodiment 79 provides a weighted fluid for treatment of a subterranean formation, the weighted fluid comprising:
calcium bromide;
manganese bromide; and
water;
wherein,
the weighted fluid has a density at standard temperature and pressure of about 1.7 g/cm$^3$ to about 2.2 g/cm$^3$,
the weighted fluid has a crystallization temperature at standard pressure of about −35° C. to about −7° C.
the weighted fluid has a pH of about 1 to about 4,
the weighted fluid is substantially free of solids having a particle size of greater than about 1 micron, and
the weighted fluid is substantially free of elemental zinc and zinc salts.

Embodiment 80 provides a method of preparing a weighted fluid for treatment of a subterranean formation, the method comprising:
forming a weighted fluid comprising
calcium bromide;
one or more secondary salts that are each independently an inorganic bromide salt other than calcium bromide; and
water;
wherein the weighted fluid has a density at standard temperature and pressure of at least about 1.7 g/cm$^3$.

Embodiment 81 provides the method, weighted fluid, or system of any one or any combination of Embodiments 1-80 optionally configured such that all elements or options recited are available to use or select from.

What is claimed is:

1. A method of treating a subterranean formation, the method comprising:
placing in the subterranean formation a weighted fluid comprising:
calcium bromide, wherein the calcium bromide is present in an amount of about 0.1% to about 15% by weight of the weighted fluid;
bismuth bromide, wherein the bismuth bromide is present in an amount of about 0.1% to about 15% by weight of the weighted fluid;
a corrosion inhibitor comprising a sulfur compound, wherein the sulfur compound is present in an amount of about 0.01% to about 50% by weight of the weighted fluid; and
cutting the weighted fluid with water, wherein the cutting the weighted fluid with water provides a cut density of less than 1.8 g/cm$^3$;
wherein the weighted fluid has a crystallization temperature at about 34.5 MPa to about 137.9 MPa of about −35° C. to about −7° C.; and
wherein the weighted fluid contains less than 1% by weight of elemental zinc and zinc salts.

2. The method of claim 1, wherein the weighted fluid contains less than 2% by weight solids.

3. The method of claim 1, wherein the crystallization temperature at about 34.5 MPa to about 137.9 MPa is about −20° C. to about −10° C.

4. The method of claim 1, wherein the weighted fluid has a pH of about 1 to about 7.

5. The method of claim 1, wherein the calcium bromide is present in an amount of about 1 wt % to about 10 wt % of the weighted fluid.

6. The method of claim 1, wherein the bismuth bromide is present in an amount of about 1 wt % to about 10 wt % of the weighted fluid.

7. The method of claim 1, wherein the weighted fluid further comprises one or more secondary salts independently selected from the group consisting of manganese bromide, tin(II) bromide, tin(IV) bromide, and indium bromide.

8. The method of claim 1, wherein the weighted fluid further comprises an acid.

9. The method of claim 1, wherein the weighted fluid further comprises an inorganic oxide or inorganic hydroxide.

10. The method of claim 1, wherein the weighted fluid further comprises manganese (II) nitrate.

11. The method of claim 1, wherein the weighted fluid further comprises one or more water-soluble polytungstate salts.

12. The method of claim 1, wherein the weighted fluid further comprises glycerol.

13. A system for performing the method of claim 1, the system comprising:
a tubular disposed in the subterranean formation; and
a pump configured to pump the weighted fluid in the subterranean formation through the tubular.

14. A method of treating a subterranean formation, the method comprising:
placing in the subterranean formation a weighted fluid comprising
calcium bromide, wherein the calcium bromide is present in an amount of about 0.1% to about 15% by weight of the weighted fluid;
bismuth bromide, wherein the bismuth bromide is present in an amount of about 0.1% to about 15% by weight of the weighted fluid;
a corrosion inhibitor comprising a sulfur compound, wherein the sulfur compound is present in an amount of about 0.01% to about 50% by weight of the weighted fluid; and
cutting the weighted fluid with water, wherein the cutting the weighted fluid with water provides a cut density of less than 1.8 g/cm$^3$;

wherein,
the weighted fluid has a crystallization temperature at about 34.5 MPa to about 137.9 MPa of about −35° C. to about −7° C.;
the weighted fluid has a pH of about 1 to about 4, the weighted fluid contains less than 1% by weight of solids having a particle size of greater than about 1 micron; and
the weighted fluid contains less than 1% by weight of elemental zinc and zinc salts.

15. A weighted fluid for treatment of a subterranean formation, the weighted fluid comprising:
calcium bromide, wherein the calcium bromide is present in an amount of about 0.1% to about 15% by weight of the weighted fluid;
bismuth bromide, wherein the bismuth bromide is present in an amount of about 0.1% to about 15% by weight of the weighted fluid;
a corrosion inhibitor comprising a sulfur compound, wherein the sulfur compound is present in an amount of about 0.01% to about 50% by weight of the weighted fluid; and
cutting the weighted fluid with water, wherein the cutting the weighted fluid with water provides a cut density of less than 1.8 g/cm$^3$;
wherein the weighted fluid has a crystallization temperature at about 34.5 MPa to about 137.9 MPa of about −35° C. to about −7° C.; and
wherein the weighted fluid contains less than 1% by weight of elemental zinc and zinc salt.

* * * * *